(12) United States Patent
Zhang et al.

(10) Patent No.: US 11,382,158 B2
(45) Date of Patent: Jul. 5, 2022

(54) DATA TRANSMISSION METHOD AND SYSTEM AND RELATED APPARATUS

(71) Applicant: TENCENT TECHNOLOGY (SHENZHEN) COMPANY LIMITED, Shenzhen (CN)

(72) Inventors: Dan Zhang, Shenzhen (CN); Binhui Ning, Shenzhen (CN); Xing Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 54 days.

(21) Appl. No.: 17/068,796

(22) Filed: Oct. 12, 2020

(65) Prior Publication Data

US 2021/0029766 A1    Jan. 28, 2021

Related U.S. Application Data

(63) Continuation of application No. PCT/CN2019/101667, filed on Aug. 21, 2019.

(30) Foreign Application Priority Data

Sep. 30, 2018 (CN) .......................... 201811160606.6

(51) Int. Cl.
*H04W 76/15* (2018.01)
*H04W 72/04* (2009.01)

(52) U.S. Cl.
CPC ....... *H04W 76/15* (2018.02); *H04W 72/0453* (2013.01)

(58) Field of Classification Search
None
See application file for complete search history.

(56) References Cited

U.S. PATENT DOCUMENTS

2012/0069804 A1   3/2012  Kim et al.
2012/0263289 A1*  10/2012 Barratt ................ H04M 3/5116
                                              379/265.02

(Continued)

FOREIGN PATENT DOCUMENTS

CN        101615992 A     12/2009
CN        103428060 A     12/2013

(Continued)

OTHER PUBLICATIONS

Yongho Seok (Mediatek), EHT Multi-band Channel Access, Aug. 16, 2018 (Year: 2018).*

(Continued)

*Primary Examiner* — The Hy Nguyen
(74) *Attorney, Agent, or Firm* — Anova Law Group, PLLC

(57) ABSTRACT

Embodiments of this application disclose a data transmission method. The data transmission method includes establishing, by a station, a multi-link to an access point, the multi-link instructing the access point to provide at least a first frequency band and a second frequency band, and the first frequency band and the second frequency band being two different frequency bands; transmitting, by the station, a first data packet to the access point on the first frequency band; and transmitting, by the station, a second data packet to the access point on the second frequency band, wherein the access point removes the first data packet or the second data packet according to a data transmission status, the second data packet and the first data packet transmitting same service data.

17 Claims, 12 Drawing Sheets

| Data packet sequence number | Frequency band identifier | Dual-link indicator |
|---|---|---|
| Bits 12 | 3 | 1 |

(56) References Cited

U.S. PATENT DOCUMENTS

| | | | |
|---|---|---|---|
| 2014/0254349 | A1 | 9/2014 | Jia et al. |
| 2015/0010366 | A1 | 4/2015 | Amini et al. |
| 2015/0103663 | A1 | 4/2015 | Amini et al. |
| 2015/0289299 | A1* | 10/2015 | Abraham ............... H04L 45/245 370/328 |
| 2016/0277170 | A1 | 9/2016 | Jia et al. |
| 2017/0289047 | A1 | 10/2017 | Szilágyi et al. |
| 2017/0294989 | A1 | 10/2017 | Chen et al. |
| 2018/0367463 | A1 | 12/2018 | Jose et al. |
| 2019/0036651 | A1* | 1/2019 | Chitrakar ............... H04L 1/1685 |
| 2019/0268099 | A1* | 8/2019 | Chu ....................... H04L 1/1621 |
| 2019/0349822 | A1 | 11/2019 | Kim et al. |
| 2019/0386779 | A1* | 12/2019 | Hong ...................... H04L 5/001 |
| 2020/0053773 | A1* | 2/2020 | Seok ........................ H04W 8/22 |
| 2021/0120587 | A1* | 4/2021 | Murakami ............. H04W 80/02 |
| 2021/0176785 | A1* | 6/2021 | Jang ....................... H04L 1/0068 |
| 2021/0227547 | A1* | 7/2021 | Chitrakar ............... H04L 5/0091 |

FOREIGN PATENT DOCUMENTS

| | | |
|---|---|---|
| CN | 105191229 A | 12/2015 |
| CN | 105430674 A | 3/2016 |
| CN | 105450367 A | 3/2016 |
| CN | 106253960 A | 12/2016 |
| EP | 3550877 A1 | 10/2019 |
| JP | 2017516366 A | 6/2017 |
| KR | 20180081436 A | 7/2018 |
| WO | 2017153630 A1 | 9/2017 |
| WO | WO-2018217901 A1 * | 11/2018 |
| WO | 2018232207 A1 | 12/2018 |
| WO | WO-2019040092 A1 * | 2/2019 |

OTHER PUBLICATIONS

The World Intellectual Property Organization (WIPO) International Search Report for PCT/CN2019/101667 dated Nov. 20, 2019 5 Pages (including translation).

The State Intellectual Property Office of the People's Republic of China (SIPO) Office Action 1 for for 201811160606.6 dated Dec. 16, 2021 11 Pages (including translation).

The European Patent Office (EPO) The Extended European Search Report for 19864977.4 dated Oct. 22, 2021 7 Pages.

The Japan Patent Office (JPO) Notification of Reasons for Refusal for Application No. 2020-563438 and Translation dated Feb. 8, 2022 9 Pages.

\* cited by examiner

DATA TRANSMISSION METHOD AND SYSTEM AND RELATED APPARATUS

RELATED APPLICATIONS

This application claims priority to PCT Application No. PCT/CN2019/101667, which claims priority to Chinese Patent Application No. 2018111606066, filed with the National Intellectual Property Administration, PRC on Sep. 30, 2018 and entitled "DATA TRANSMISSION METHOD AND SYSTEM AND RELATED APPARATUS". The two applications are both incorporated herein by reference in their entirety.

FIELD OF THE TECHNOLOGY

The application relates to the field of wireless communication, and in particular, to a data transmission method and system and a related apparatus.

BACKGROUND OF THE DISCLOSURE

With the smart devices and the pan-entertainment industries becoming more and more popular, uses need a wireless network almost everywhere. In recently years, the network is also developed to have a higher throughput. The 802.11ac protocol launched in 2013 reaches a theoretical maximum value of 7 Gbps for single-user transmission, and the new-generation 802.11ax protocol further increases an average transmission rate of each user in a user-intensive environment by more than 4 times. Such a high throughput has greatly exceeded the requirements of common users in daily life.

At present, to improve a transmission rate and a throughput of a system, spatial multiplexing and space diversity technologies of multiple-input multiple-output (MIMO) may be used. The space diversity technology refers to sending spatial flows of the same information through different paths by using a plurality of transmit antennas at a transmitting end, and obtaining, at a receiving end, a plurality of independent fading spatial flows of the same data, to improve data reliability. The spatial multiplexing technology refers to dividing data that needs to be transmitted into a plurality of data flows for transmission on different antennas, to improve the transmission rate of the system.

However, a mobile service, particularly a real-time game, has a large number of users, whose requirement on the wireless network turns to stable and reliable low-latency transmission, while the MIMO technology considers only the increase in the transmission speed and the throughput, and does not improve the stability under the condition of low-throughput transmission. Therefore, the MIMO technology is not applicable to a scenario with relatively high requirements on network stability and reliability.

SUMMARY

Embodiments of this application provide a data transmission method and system and a related apparatus, according to which a station transmits the same data packet to an access point by using different frequency bands, to avoid delayed arrival or loss of the data packet due to an extremely high instantaneous delay, thereby improving network reliability.

In view of this, a first aspect of this application provides a data transmission method. The data transmission method includes establishing, by a station, a multi-link to an access point, the multi-link instructing the access point to provide at least a first frequency band and a second frequency band, and the first frequency band and the second frequency band being two different frequency bands; transmitting, by the station, a first data packet to the access point on the first frequency band; and transmitting, by the station, a second data packet to the access point on the second frequency band, wherein the access point removes the first data packet or the second data packet according to a data transmission status, the second data packet and the first data packet transmitting same service data.

Another aspect of this application provides a station. The station includes a memory and a processor configured to: establish a multi-link to an access point, the multi-link instructing the access point to provide at least a first frequency band and a second frequency band, and the first frequency band and the second frequency band being two different frequency bands; transmit a first data packet to the access point on the first frequency band; and transmit a second data packet to the access point on the second frequency band, the access point removing the first data packet or the second data packet according to a data transmission status, the second data packet and the first data packet transmitting same service data.

Another aspect of this application provides an access point. The access point includes a memory, a transceiver, and a processor, the memory being configured to store a program; and the processor being configured to execute the program in the memory, to perform the following operations: establishing a multi-link to a station, the multi-link instructing the access point to provide at least a first frequency band and a second frequency band, and the first frequency band and the second frequency band being two different frequency bands; receiving, on the first frequency band, a first data packet transmitted by the station; receiving, on the second frequency band, a second data packet transmitted by the station, the second data packet and the first data packet transmitting same service data; and removing the first data packet or the second data packet according to a data transmission status.

Another aspect of this application provides a non-transitory computer-readable storage medium, storing instructions, the instructions, when run on a computer of a station, causing the computer to perform: establishing a multi-link to an access point, the multi-link instructing the access point to provide at least a first frequency band and a second frequency band, and the first frequency band and the second frequency band being two different frequency bands; transmitting a first data packet to the access point on the first frequency band; and transmitting a second data packet to the access point on the second frequency band. The access point removes the first data packet or the second data packet according to a data transmission status, the second data packet and the first data packet transmitting same service data. In the embodiments of this application, a data transmission method is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data.

According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

DESCRIPTION OF EMBODIMENTS

Embodiments of this application provide a data transmission method and system and a related apparatus, according to which a station transmits the same data packet to an access point by using different frequency bands, to avoid delayed arrival or loss of the data packet due to an extremely high instantaneous delay, thereby improving network reliability.

In the specification, claims, and accompanying drawings of this application, the terms "first", "second", "third", "fourth", and so on (if any) are intended to distinguish between similar objects but do not necessarily indicate a specific order or sequence. It is to be understood that data used in this way is interchangeable in a suitable case, so that the embodiments of this application described herein can be implemented in a sequence in addition to the sequence shown or described herein. Moreover, the terms "include", "contain", and any other variants mean to cover the non-exclusive inclusion, for example, a process, method, system, product, or device that includes a list of operations or units is not necessarily limited to those expressly listed operations or units, but may include other operations or units not expressly listed or inherent to such a process, method, system, product, or device.

Figure 1:
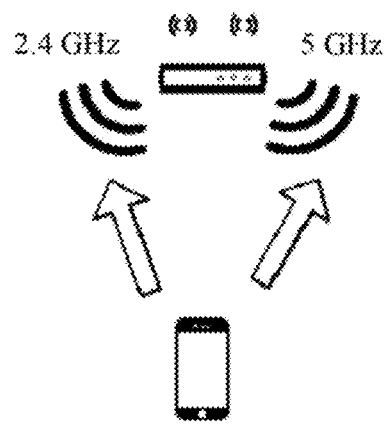
FIG. 1 is a schematic architectural diagram of a data transmission system according to the embodiments of this application.

It is to be understood that the embodiments of this application are mainly applied to a wireless fidelity (Wi-Fi) scenario. Wi-Fi is a technology allowing an electronic device to be connected to a wireless local area network (WLAN), and usually uses a 2.4 gigahertz (GHz) or 5 GHz frequency band. Generally, the WLAN is protected by a password, which, however, may alternatively be open, so that any device within a range of the WLAN may be allowed to be connected to the WLAN. An objective is to improve interconnectivity between wireless network products that are based on the institute of electrical and electronics engineers (IEEE) 802.11 standard. This application may be applied to a Wi-Fi scenario shown in FIG. 1. FIG. 1 is a schematic architectural diagram of a data transmission system according to the embodiments of this application. As shown in the figure, a terminal device may be connected to two different Wi-Fi frequency bands. The two frequency bands shown in FIG. 1 are merely an example. In an actual application, in addition to a 2.4 GHz frequency band and a 5 GHz frequency band, the terminal device may be further connected to a 6 GHz frequency band, a 60 GHz frequency band, or the like. Herein, the 2.4 GHz frequency band and the 5 GHz frequency band are used as examples for description, and do not constitute a limitation on this application. The terminal device in FIG. 1 includes, but is not limited to, a smartphone, a tablet computer, a notebook computer, a palmtop computer, and a personal computer. An access point may be a router. The router shown in FIG. 1 is a dual-band Wi-Fi device including the 2.4 GHz frequency band and the 5 GHz frequency band, and may further implement an automatic signal roaming function. Generally, the terminal device is automatically connected to the higher-speed 5 GHz frequency band when at a short distance, and may be connected to the 2.4 GHz frequency band with better wall penetration quality when at a long distance.

Figure 2:
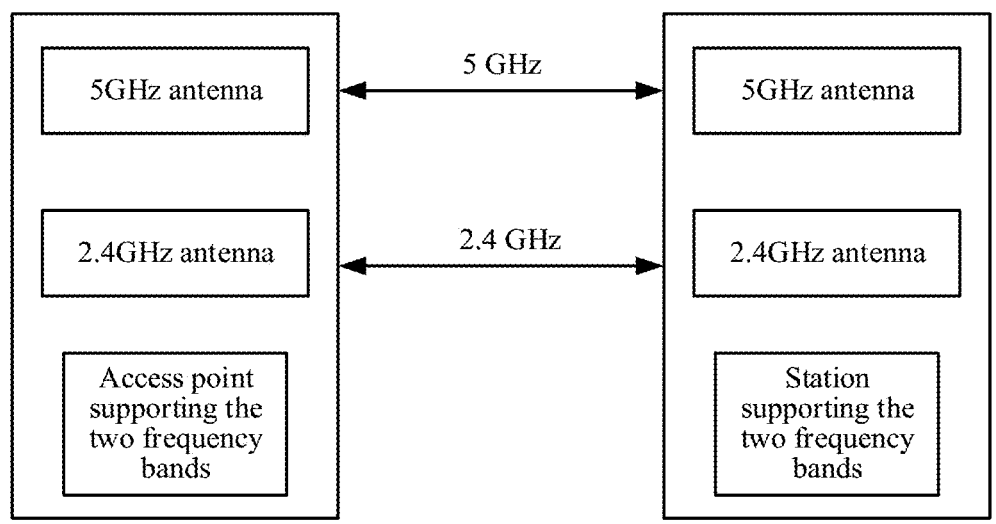
FIG. 2 is a schematic diagram of establishing a multi-link between a station and an access point according to the embodiments of this application.

FIG. 2 is a schematic diagram of establishing a multi-link between a station and an access point according to the embodiments of this application. As shown in the figure, in an extended service set (ESS), two different frequency bands may be connected to through a service set identifier (SSID). A data packet is duplicated on the two different frequency bands and transmitted on two physical lines. Deduplication processing is performed on received data packets by the access point supporting two frequency bands or the station supporting two frequency bands.

Figure 3:
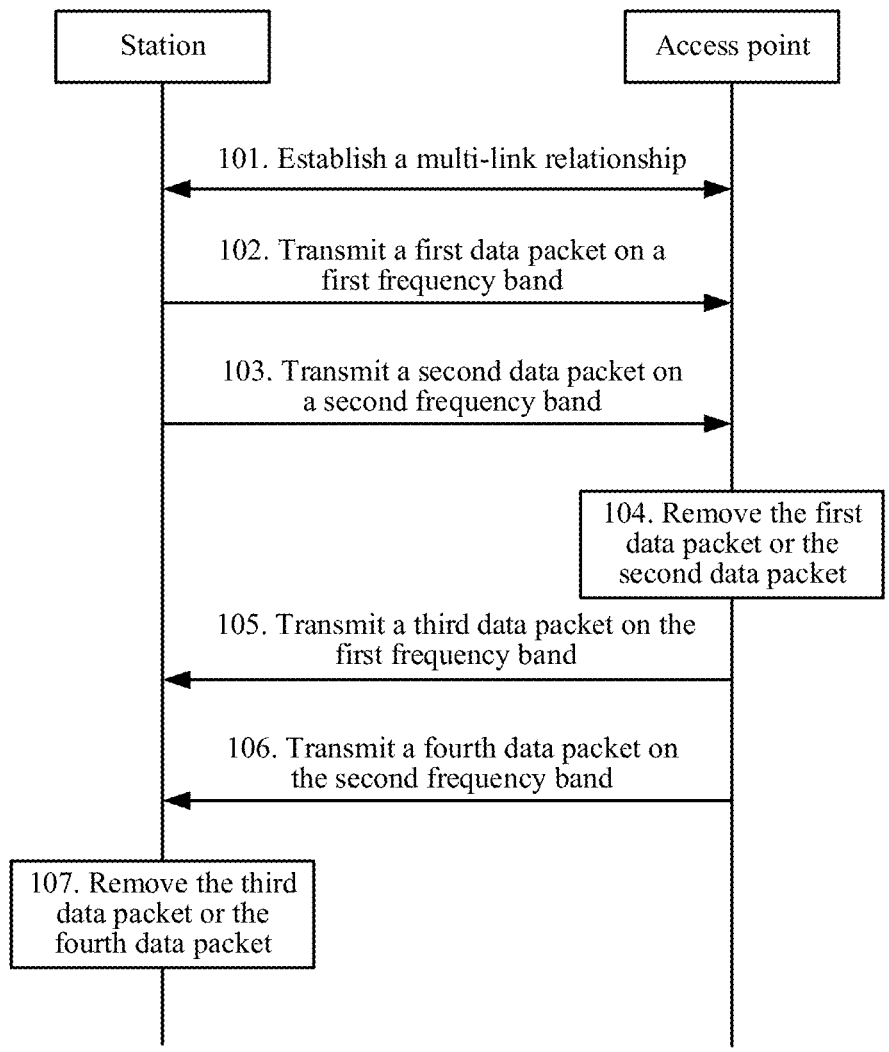
FIG. 3 is a schematic diagram of an interaction embodiment of a data transmission method according to the embodiments of this application.

For ease of understanding, FIG. 3 is a schematic diagram of an interaction embodiment of the data transmission method according to the embodiments of this application. As shown in the figure, specifically:

Step 101. A station needs to first establish a multi-link to an access point. The multi-link indicates that the station may be connected to the access point having two different frequency bands (for example, a 2.4 GHz frequency band and a 5 GHz frequency band).

Step 102. The station may transmit a first data packet to the access point on a first frequency band (for example, the 2.4 GHz frequency band) when the station needs to transmit data to the access point.

Step 103. The station may transmit a second data packet to the access point on a second frequency band (for example, the 5 GHz frequency band) when the station needs to transmit the data to the access point. Herein, the second data packet and the first data packet transmit the same service data, but are transmitted on different frequency bands.

A sequence of performing step 102 and step 103 may be that step 102 is performed before step 103 is performed, or step 103 is performed before step 102 is performed, or step 102 and step 103 are simultaneously performed.

Step 104. After receiving the first data packet and the second data packet, the access point selects one of the data packets according to a data transmission status and deletes the data packet. For example, if the first data packet first arrives at the access point, and data in the first data packet is complete, the access point removes the second data packet.

Step 105. The access point may transmit a third data packet to the station on the first frequency band (for example, the 2.4 GHz frequency band) when the access point needs to transmit data to the station.

Step 106. The access point may transmit a fourth data packet to the station on the second frequency band (for example, the 5 GHz frequency band) when the access point needs to transmit the data to the station. Herein, the fourth data packet and the third data packet transmit the same service data, but are transmitted on different frequency bands.

Step 107. After receiving the third data packet and the fourth data packet, the station selects one of the data packets according to a data transmission status and deletes the data packet. For example, if the third data packet first arrives at the station, and data in the third data packet is complete, the station removes the fourth data packet.

A sequence of performing step 105 and step 106 may be that step 105 is performed before step 106 is performed, or step 106 is performed before step 105 is performed, or step 105 and step 106 are simultaneously performed. In addition, step 102 to step 104 may be performed after step 101, or may be performed after step 106.

It is to be understood that the embodiments of this application may be specifically applied to an application that has high network stability but has a low throughput, that is, an application that has particular requirements for high stability and a low latency, for example, an industrial control application, an interactive application in daily life, or a game.

Figure 4:
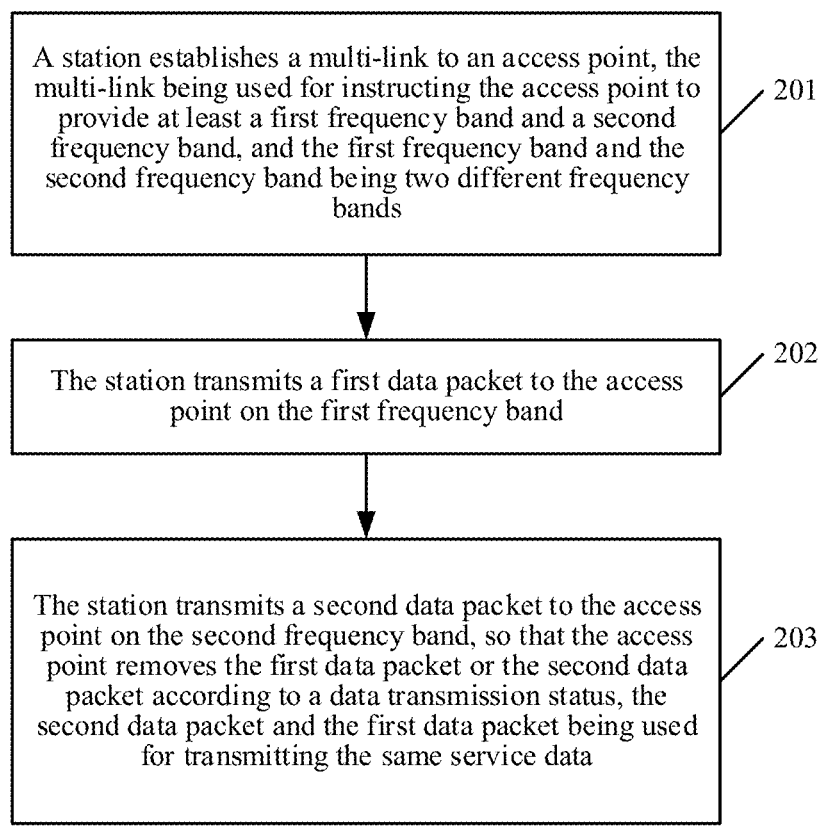
FIG. 4 is a schematic diagram of an embodiment of a data transmission method according to the embodiments of this application.

The following describes the data transmission method in this application from the perspective of a station. Referring to FIG. 4, an embodiment of the data transmission method according to the embodiments of this application includes the following steps: 201. The station sets up a multi-link to an access point, the multi-link instructing the access point to provide at least a first frequency band and a second frequency band, and the first frequency band and the second frequency band being two different frequency bands.

In this embodiment, a multi-link needs to be first establish between the station and the access point. The multi-link indicates that the station may be connected to the access point having at least two different frequency bands. The two frequency bands include a first frequency band (for example, a 2.4 GHz frequency band) and a second frequency band (for example, a 5 GHz frequency band). Based on capabilities of the station and the access point to work on a plurality of frequency bands at the same time, a specific data flow is duplicated between the station and the access point, transmitted on two different frequency bands or channels to a peer end through multiband operation (MBO) coordination of a service management entity (SME), and deduplicated at the peer end.

In an actual application, the station may be specifically a smartphone. For ease of description, the following describes an operation of establishing a multi-link with reference to FIG. 5 and FIG. 6.

Figure 5:
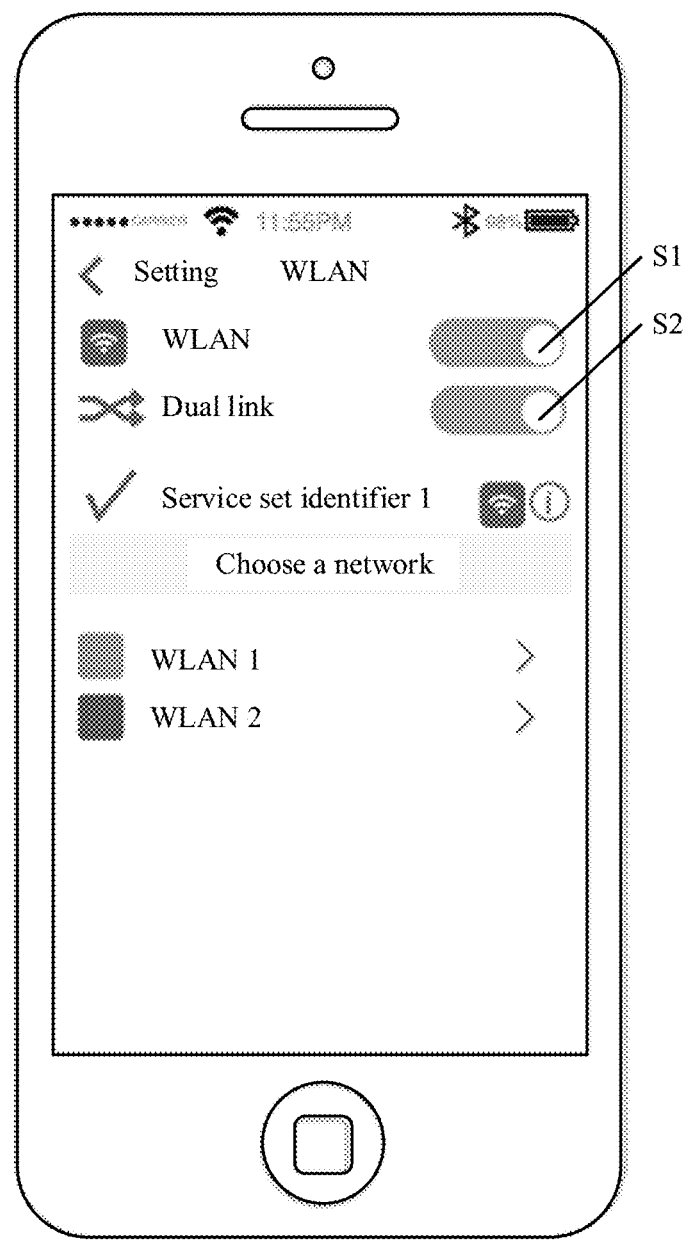
FIG. 5 is a schematic diagram of an interface of automatically establishing a multi-link according to the embodiments of this application.

A first multi-link setup method is an automatic connection. FIG. 5 is a schematic diagram of an interface of automatically establishing a multi-link according to the embodiments of this application. As shown in the figure, a user may manually tap a Wi-Fi switch denoted by S1, and a Wi-Fi network may be automatically connected to after the Wi-Fi switch is turned on (if the connection needs a password, the user further needs to enter the password manually). Then the user may manually tap a dual-link switch denoted by S2, and after the dual-link switch is turned on, an SSID may be automatically selected. If a dual-link function needs to be disabled, the user needs to turn off the dual-link switch in the setting interface.

Correspondingly, the access point may integrate Wi-Fi of the two frequency bands by using a multi-frequency integration technology to share one SSID, and automatically select a more stable Wi-Fi frequency band at a faster speed according to a network access status of the station. The frequency band does not need to be manually switched, and a seamless roaming protocol is supported, thereby ensuring smooth switching of the station between different signal nodes, and providing a smooth and seamless Wi-Fi environment to the user. In addition, the access point may further transmit data to a plurality of stations at the same time, thereby greatly improving efficiency and increasing a quantity of served machines.

Figure 6:
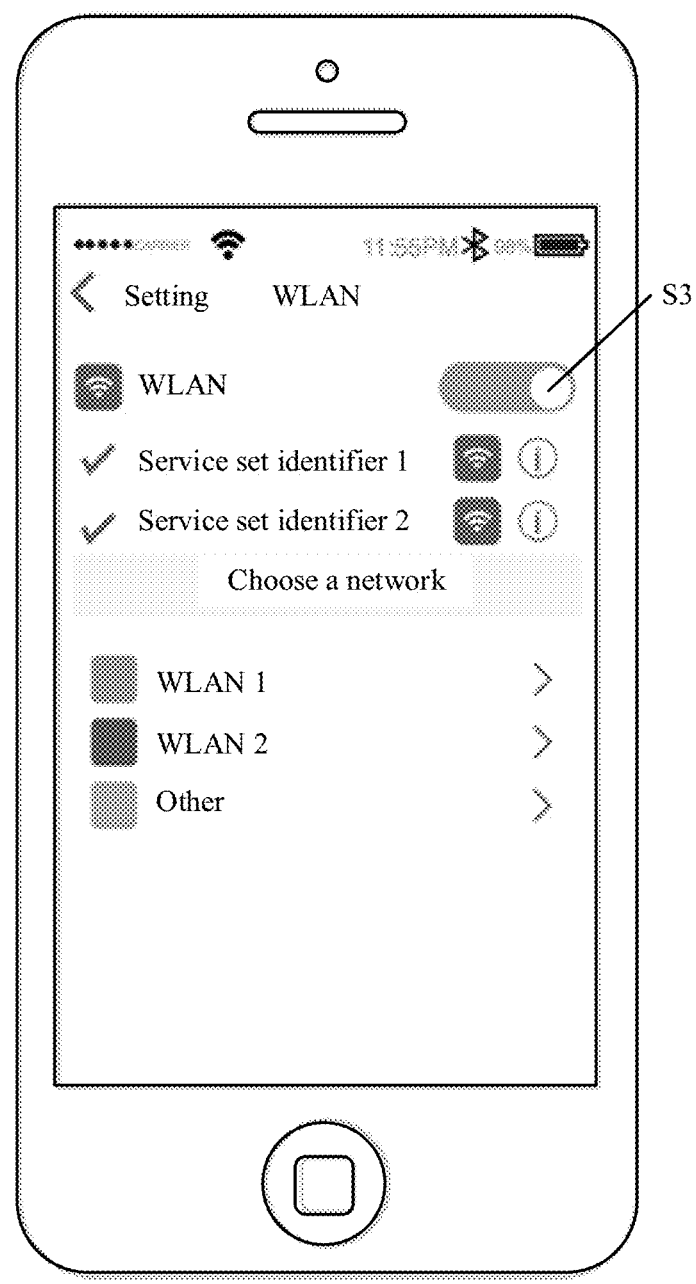
FIG. 6 is a schematic diagram of an interface of manually establishing a multi-link according to the embodiments of this application.

A second multi-link setup method is a manual connection. FIG. 6 is a schematic diagram of an interface of manually establishing a multi-link according to the embodiments of this application. As shown in the figure, an access point having a plurality of frequency bands may be provided with a plurality of SSIDs. Therefore, a dual-link function may alternatively be enabled by manually connecting to two different SSIDs on an smart terminal. When connecting to the second SSID, the smart terminal identifies that two SSIDs do not belong to the same frequency band.

202. The station transmits a first data packet to the access point on the first frequency band.

In this embodiment, the station may transmit the first data packet to the access point on the first frequency band (for example, the 2.4 GHz frequency band) when the station needs to transmit data to the access point. Before transmitting the data, the station needs to first obtain, through replication, two data packets carrying the same service data, that is, the first data packet and a second data packet in this embodiment.

203. The station transmits a second data packet to the access point on the second frequency band, so that the access point removes the first data packet or the second data packet according to a data transmission status, the second data packet and the first data packet transmitting the same service data.

In this embodiment, the station may transmit the second data packet to the access point on the second frequency band (for example, the 5 GHz frequency band) when the station needs to transmit the data to the access point. Herein, the second data packet and the first data packet transmit the same service data, but are transmitted on different frequency bands.

After receiving the first data packet and the second data packet, the access point selects one of the data packets according to a data transmission status and deletes the data packet, that is, performs deduplication processing on the data packets. Assuming that the first data packet first arrives at the access point, and data in the first data packet is valid, the access point removes the second data packet. Otherwise, assuming that the second data packet first arrives at the access point, and data in the second data packet is valid, the access point removes the first data packet.

It may be understood that if there are three frequency bands, the access point receives three data packets from the station. The three data packets are transmitted to the access point on different frequency bands. The access point needs to determine, according to a transmission status, which two data packets are removed. Certainly, in an actual application, there may be four or more frequency bands, and all the frequency band transmit the same data packet.

A sequence of performing step 202 and step 203 may be that step 202 is performed before step 203 is performed, or step 203 is performed before step 202 is performed, or step 202 and step 203 are simultaneously performed.

In this embodiment of this application, a data transmission method is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 4, in a first optional embodiment of the data transmission method provided in the embodiments of this application, the establishing, by a station, a multi-link to an access point may include: transmitting, by the station, a first multi-link request to the access point; establishing, by the access point, a communication connection to the station on the first frequency band according to the first multi-link request; transmitting, by the station, a second multi-link request to the access point; and establishing, by the access point, a communication connection to the station on the second frequency band according to the second multi-link request.

In this embodiment, in a process in which the station sets up the multi-link to the access point, the station generally needs to transmit two connection requests to the access point. Specifically, the station first transmits the first multi-link request to the access point, the request establishing the communication connection between the access point and the station on the first frequency band (for example, the 2.4 GHz frequency band). When enabling a dual-link function, the station transmits the second multi-link request to the access point, the request establishing the communication connection between the access point and the station on the second frequency band (for example, the 5 GHz frequency band).

In an actual application, the access point may be a router supporting a plurality of frequency bands, or may be integrated by a plurality of routers supporting a single frequency band. This is not limited herein.

In addition, in this embodiment of this application, two connections need to be establish between the station and the access point. Specifically, the station transmits the first multi-link request to the access point, and sets up the communication connection on the first frequency band. Next, the station transmits the second multi-link request to the access point, and sets up the communication connection on the second frequency band according to the second multi-link request. According to the foregoing method, a specific implementation is provided for a solution of dual-band connection, thereby ensuring feasibility and operability of the solution.

In some embodiments, based on the first embodiment corresponding to FIG. 4, in a second optional embodiment of the data transmission method provided in the embodiments of this application, the access point includes a first sub-access point and a second sub-access point, and the transmitting, by the station, a first multi-link request to the access point may include: transmitting, by the station, a multi-link verification request to the second sub-access point after the station is associated with the first sub-access point, and receiving, by the access point by using the second sub-access point, the multi-link verification request transmitted by the station; transmitting, by the access point, a multi-link verification response to the station by using the second sub-access point, and receiving, by the station, the multi-link verification response transmitted by the second sub-access point; transmitting, by the station, a multi-link association request to the second sub-access point, and receiving, by the access point by using the second sub-access point, the multi-link association request transmitted by the station; and transmitting, by the access point, a multi-link association response to the station by using the second sub-access point, and receiving, by the station, the multi-link association response transmitted by the second sub-access point, the multi-link association response associating the first frequency band with the second frequency band.

In this embodiment, one access point may further include a plurality of sub-access points, and the sub-access points are deployed in the access point. For example, there are two sub-access points, the two sub-access points are respectively defined as a first sub-access point and a second sub-access point, and the first sub-access point and the second sub-access point may have the same MAC address, or may have different MAC addresses. This is not limited herein. In an actual application, the first sub-access point and the second sub-access point may be represented as the same SSID in a display interface of the station. After the station enables the multi-link function, the access point automatically enables two frequency bands. In some embodiments, the first sub-access point and the second sub-access point may alternatively be represented as two different SSIDs in the display interface of the station. After the station enables the multi-link function, the access point provides the first frequency band according to one SSID and provides the second frequency band according to the other SSID.

Figure 7:
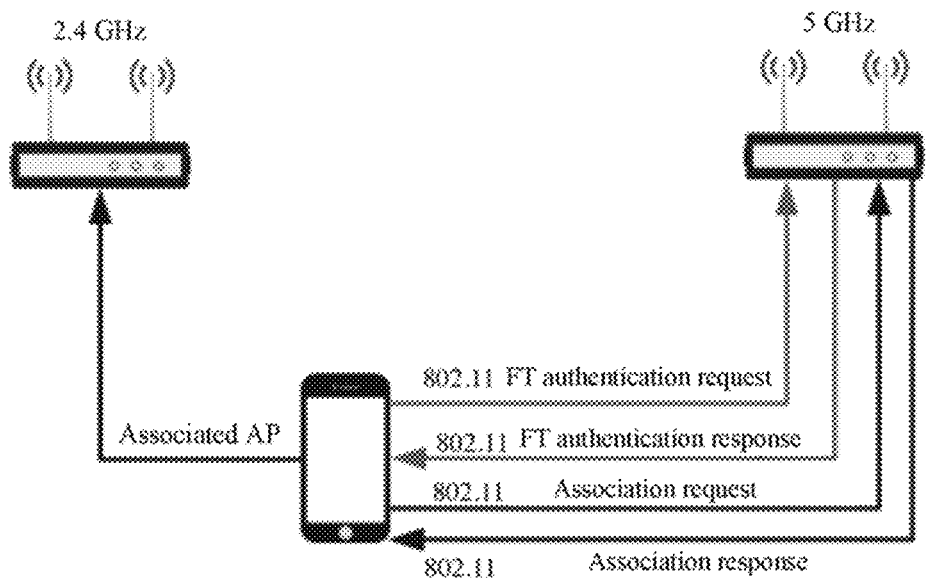
FIG. 7 is a schematic diagram of an embodiment of association of a plurality of frequency bands according to the embodiments of this application.

For ease of description, FIG. 7 is a schematic diagram of an embodiment of association of a plurality of frequency bands according to the embodiments of this application. A station is first connected to a first sub-access point in an extended service set (ESS) by using one SSID. The first sub-access point provides a 2.4 GHz frequency band. The station and the first sub-access point establish a connection relationship, that is, the station needs to first perform an authentication procedure and an association procedure with the first sub-access point. It may be considered that association between the station and the first sub-access point has been completed currently after the station receives an association response fed back by the first sub-access point.

A method in which the station is associated with the first sub-access point may be active scanning, or may be passive scanning. The active scanning means that the station transmits a request on each channel in an active method, to request a specific wireless network to respond. The active scanning is to actively find a network instead of waiting for a wireless network to state existence of the network. A station that uses the active scanning scans channels listed in a channel list by using the following program. Currently, most mobile electronic products use the passive scanning method, because no signal needs to be transmitted during scanning, and power may be saved. In the passive scanning, the station continuously switches between channels listed in a channel list.

When enabling the dual-link function, the station initiates an authentication request to a second sub-access point with a non-2.4 GHz frequency band in the ESS. In other words, the station transmits a multi-link verification request to the second sub-access point. The multi-link verification request may be represented as an "802.11 fast BSS transition (FT) authentication (auth) request". The second sub-access point transmits a multi-link verification response to the station. The multi-link verification response may be represented as an "802.11 FT auth response". The biggest defect of the wireless network lies in security. Therefore, it is necessary to perform identity authentication, and connection work for the authentication also needs to be encrypted, to prevent access of an unauthorized user. The authentication method herein may be open system authentication or shared key authentication. The authentication process includes the following two steps: First, the station transmits an identity statement and an authentication request. Second, the access point replies with an authentication result. If the returned result is "success", it indicates that the station and the access point are successfully authenticated by each other.

After the authentication is completed, the station further transmits an association request to the second sub-access point. In other words, the station transmits a multi-link association request to the second sub-access point. The multi-link association request may be represented as an "802.11 association request". The second sub-access point transmits a multi-link association response to the station. The multi-link association response may be represented as an "802.11 association response". The station is associated with the access point, to obtain a complete right to access the network. The association is a record process and enables a distributed system to record a location of each station, to forward a data packet that is transmitted to the station to a correct access point. Once the association request is approved, the access point makes a response by using a status code 0 representing success and an association identifier (AID). If the association request fails, only a status code is returned, and the entire process is ended.

In addition, in this embodiment of this application, a method of authentication between a station and an access point is described. To be specific, the station transmits a multi-link verification request to a second sub-access point, then the access point transmits a multi-link verification response to the station by using the second sub-access point, then the station transmits a multi-link association request to the second sub-access point, and finally the access point transmits a multi-link association response to the station by using the second sub-access point. The multi-link association response associating a first frequency band with a second frequency band. According to the foregoing method, authentication further needs to be performed between the station and the access point, to verify an identity of a user and an available network service, and the network service is opened to the station according to an authentication result, thereby improving network reliability and security.

In some embodiments, based on the second embodiment corresponding to FIG. 4, in a third optional embodiment of the data transmission method provided in the embodiments of this application, the transmitting, by the station, a second multi-link request to the access point so that the access point and the station establish a communication connection on the second frequency band may include: transmitting, by the station, a multi-link setup request to the access point, and receiving, by the access point, the multi-link setup request transmitted by the station; transmitting, by the access point, a multi-link setup response to the station, and receiving, by the station, the multi-link setup response transmitted by the access point; transmitting, by the station, a multi-link acknowledgment request to the access point, and receiving, by the access point, the multi-link acknowledgment request transmitted by the station; and transmitting, by the access point, a multi-link acknowledgment response to the station, and receiving, by the station, the multi-link acknowledgment response transmitted by the access point, so that the access point sets up the communication connection to the station on the second frequency band.

Figure 8:
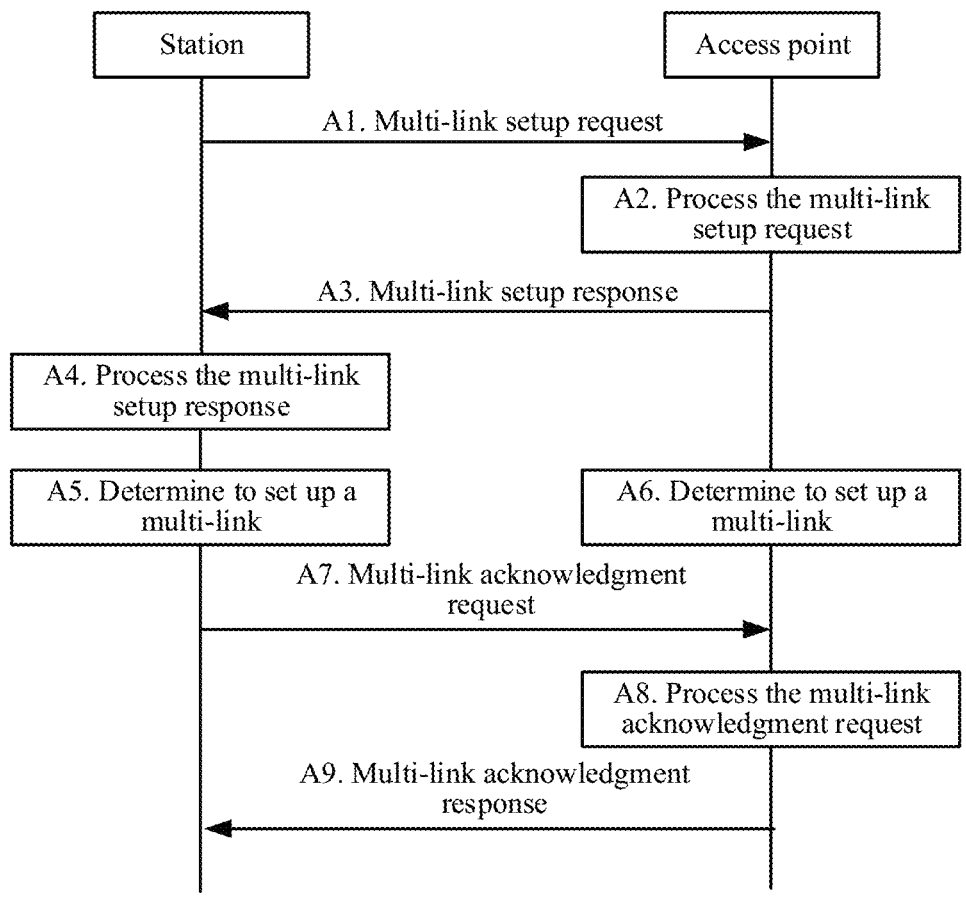
FIG. 8 is a schematic flowchart of establishing a dual-link between a station and an access point according to the embodiments of this application.

In this embodiment, a procedure of establishing a multi-link between a station and an access point is described with reference to FIG. 8. The access point herein may specifically refer to a second sub-access point. FIG. 8 is a schematic flowchart of establishing a dual-link between a station and an access point according to the embodiments of this application. The access point herein includes a first sub-access point and a second sub-access point that have been associated. Specifically:

Step A1. A station supporting a plurality of frequency bands transmits a dual-link setup request to an access point supporting a plurality of frequency bands.

Step A2. The access point processes the dual-link setup request.

Step A3. After processing the dual-link setup request, the access point generates an FT setup response, and transmits the FT setup response to the station.

Step A4. After receiving the FT setup response, the station processes the FT setup response.

Step A5. The station determines to establish a multi-link, which may be specifically a dual-link.

Step A6. The access point determines to establish a multi-link, which may be specifically a dual-link.

Step A7. After the station and the access point determine that the multi-link needs to be establish, the station transmits a dual-connection ACK request to the access point.

Step A8. The access point processes the dual-link ACK request, and generates a dual-link ACK response.

Step A9. The access point transmits the dual-link ACK response to the station, so that the dual-link is establish between the station and the access point.

In some embodiments, in this embodiment of this application, a method of establishing a dual-link between a station and an access point is provided. To be specific, the station transmits a multi-link setup request to the access point, the access point transmits a multi-link setup response to the station, the station transmits a multi-link acknowledgment request to the access point, and the access point transmits a multi-link acknowledgment response to the station, so that the access point and the station establish a communication connection on the second frequency band. According to the foregoing method, a connection further needs to be establish between the station and the access point, and the entire dual-link process may be completed through interaction between the station and the access point, thereby ensuring practicality and feasibility of the solution.

In some embodiments, based on the embodiment corresponding to FIG. 4, in a fourth optional embodiment of the data transmission method provided in the embodiments of this application, the establishing, by a station, a multi-link to an access point may include: receiving, by the station, a multi-link enabling request transmitted by the access point, the multi-link enabling request being generated by the access point according to a target service, and the target service satisfying a multi-link enabling condition; transmitting, by the station, a first multi-link request to the access point according to the multi-link enabling request; establishing, by the access point, a communication connection to the station on the first frequency band according to the first multi-link request; transmitting, by the station, a second multi-link request to the access point according to the multi-link enabling request; and establishing, by the access point, a communication connection to the station on the second frequency band according to the second multi-link request.

In this embodiment, the access point may further actively detect a network status, and determine, according to the network status, whether a prompt of dual-link needs to be transmitted to the station. In other words, the access point supporting the dual-link has a capability of collecting whether a dual-link function is supported by the station. When the access point detects that a throughput of a service is less than a first preset threshold and a network latency of the service is greater than a second preset threshold, it may be considered that the service satisfies a multi-link setup condition, and the service is determined as a target service. When determining that the target service is currently run, the access point actively transmits a multi-link enabling request to the station. After receiving the multi-link enabling request, the station displays a prompt notification in a display interface, to notify a user that the multi-link function may be enabled.

After determining to enable the multi-link function, the station first transmits the first multi-link request to the access point, to establish the communication connection on the first frequency band, and then the station continues to transmit the second multi-link request to the access point, to establish the communication connection on the second frequency band.

In addition, in this embodiment of this application, the station may further receive the multi-link enabling request transmitted by the access point, the multi-link enabling request being generated by the access point according to the target service, and the target service satisfying the multi-link enabling condition. Next, the station transmits the first multi-link request to the access point according to the multi-link enabling request, and sets up the first multi-link request by using the first multi-link request. Then the station transmits the second multi-link request to the access point according to the multi-link enabling request, and sets up the second multi-link request according to the second multi-link request. According to the foregoing method, the access point supporting the dual-link may actively detect service traffic. When the service traffic belongs to a high-latency application, the access point may actively request the station to enable the dual-link function. Therefore, another feasible method is provided for implementation of the solution, and flexibility of the solution is improved.

In some embodiments, based on the embodiment corresponding to FIG. 4, in a fifth optional embodiment of the data transmission method provided in the embodiments of this application, the first data packet carries a first sequence number and a first frequency band identifier, the first sequence number indicating an occurrence order of the first data packet, and the first frequency band identifier indicating the first frequency band.

The second data packet carries a second sequence number and a second frequency band identifier, the second sequence number indicating an occurrence order of the second data packet, and the second frequency band identifier indicating the second frequency band.

In this embodiment, a data packet generated by the station or the access point further needs to carry a sequence number and a frequency band identifier. The sequence number indicating an occurrence order of the data packet, and the frequency band identifier indicating a frequency band the data packet is transmitted on.

Figure 9:
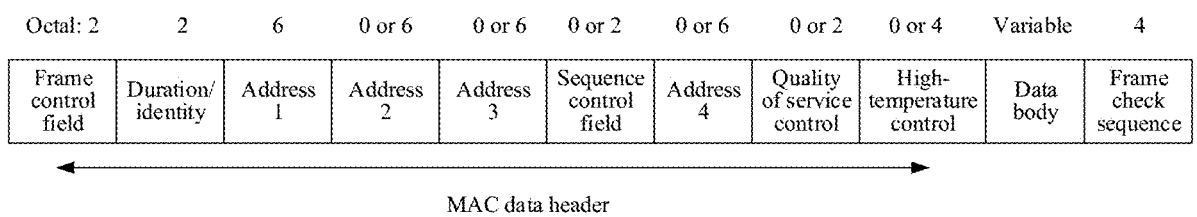
FIG. 9 is a schematic diagram of a frame format of a media access control (MAC) data packet according to the embodiments of this application.

Specifically, FIG. 9 is a schematic diagram of a frame format of a MAC data packet according to the embodiments of this application. As shown in the figure, one data packet may include a MAC header and payload, and the data packet may include: a 16-bit frame control field; a 16-bit duration/identity (ID) field; address fields, an address 1 representing a receive end, an address 2 representing a transmit end, and an address 3 being used by the receive end to filter an address, for example, the third address in a network is used by the receive end to determine whether the frame belongs to a network to which the receive end is connected; and a 16-bit sequence control field used for recombining frame segments and discarding a duplicated frame, a counter starting from 0 and being increased by 1 each time a MAC layer processes a packet; a data body used for transmitting payload; and a frame check sequence (FCS) enabling the station to check integrity of the received frame.

Figure 10:
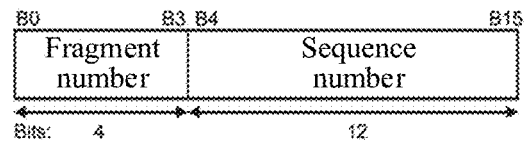
FIG. 10 is a schematic diagram of composition of a sequence control field in the related art.
Figure 11:
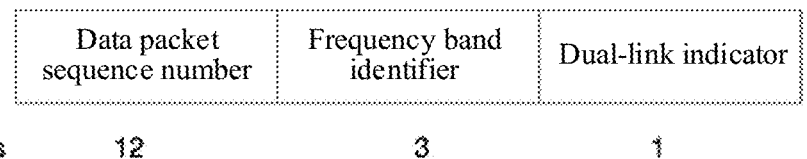
FIG. 11 is a schematic diagram of composition of a sequence control field according to the embodiments of this application.

More specifically, FIG. 10 is a schematic diagram of composition of a sequence control field in the related art. As shown in the figure, a sequence control field in a data packet header includes a 4-bit segment number field and a 12-bit sequence number field. FIG. 11 is a schematic diagram of composition of a sequence control field according to the embodiments of this application. As shown in the figure, a sequence control field in a data packet header includes a 12-bit sequence number, a three-bit frequency band identifier (band ID), and a 1-bit dual-link indicator. The sequence number indicating sequence numbers of data packets on different physical links after the dual-link function is enabled. The band ID indicating different physical links. The dual-link indicator indicating whether the dual-link function is enabled. 0 indicates that the dual-link function is disabled, and 1 indicates that the dual-link function is enabled.

In headers of data packets, sequence numbers belonging to the same MAC service data unit (MSDU) are configured to be the same. Therefore, the sequence numbers may be used for identifying duplicated data packets on two links and converged at a peer end.

Generally, filtering of duplicated data packets is represented by the sequence control field, and a data frame, a management frame, an extension frame, and a redundant frame may include the sequence control field. This is not limited herein.

In addition, in this embodiment of this application, a data packet composition method is provided. To be specific, a header of a data packet carries a sequence number and a frequency band identifier, the frequency band identifier determining a frequency band the data packet is transmitted on, and the sequence number determining a transmission order of the data packet. According to the foregoing method, the station or the access point may determine a deduplication object by parsing the data packet, thereby improving reliability and accuracy of deduplication.

In some embodiments, based on FIG. 4 and any one of the first to the fifth embodiments corresponding to FIG. 4, in a sixth optional embodiment of the data transmission method provided in the embodiments of this application, after the establishing, by a station, a multi-link to an access point, the method may further include: transmitting, by the access point, a third data packet to the station on the first frequency band, and receiving, by the station on the first frequency band, the third data packet transmitted by the access point, the third data packet carrying a third sequence number and the first frequency band identifier, the third sequence number indicating an occurrence order of the third data packet, and the first frequency band identifier indicating the first frequency band; and transmitting, by the access point, a fourth data packet to the station on the second frequency band, and receiving, by the station on the second frequency band, the fourth data packet transmitted by the access point, the fourth data packet and the third data packet being using for transmitting the same service data, a fourth sequence number indicating an occurrence order of the fourth data packet, and the second frequency band identifier indicating the second frequency band.

In this embodiment, after the multi-link is establish between the station and the access point, the station not only may transmit data packets to the access point, but also may receive data packets from the access point.

Specifically, the access point may transmit the third data packet to the station on the first frequency band (for example, the 2.4 GHz frequency band) when the access point needs to transmit data to the station. The access point may transmit the fourth data packet to the station on the second frequency band (for example, the 5 GHz frequency band). Herein, the third data packet and the fourth data packet transmit the same service data, but are transmitted on different frequency bands. Before transmitting the data, the access point needs to first obtain through replication two data packets carrying the same service data, that is, the third data packet and the fourth data packet in this embodiment.

After receiving the third data packet and the fourth data packet, the station selects one of the data packets according to a data transmission status and deletes the data packet, that is, performs deduplication processing on the data packets. Assuming that the third data packet first arrives at the station, and data in the third data packet is valid, the station removes the fourth data packet. Otherwise, assuming that the fourth data packet first arrives at the station, and data in the fourth data packet is valid, the station removes the third data packet.

It may be understood that if there are three frequency bands, the station receives three data packets from the access point. The three data packets are transmitted to the station on different frequency bands. The station needs to determine, according to a transmission status, which two data packets are removed. Certainly, in an actual application, there may be four or more frequency bands, and all the frequency band transmit the same data packet.

In some embodiments, in this embodiment of this application, a data transmission method is provided. First, a multi-link is establish between a station and an access point, the multi-link instructing the access point to provide at least a first frequency band and a second frequency band, and the first frequency band and the second frequency band being two different frequency bands. Then the access point transmits a third data packet to the station on the first frequency band and transmits a fourth data packet to the station on the second frequency band, and the station receives, on the first frequency band, the third data packet transmitted by the access point and receives, on the second frequency band, the fourth data packet transmitted by the access point, and removes the third data packet or the fourth data packet according to a data transmission status, the third data packet and the fourth data packet transmitting the same service data. According to the foregoing method, the access point transmits the same data packet to the station by using different frequency bands, and the station determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the sixth embodiment corresponding to FIG. 4, in a seventh optional embodiment of the data transmission method provided in the embodiments of this application, the removing, by the station, the third data packet or the fourth data packet according to a data transmission status may include: removing, by the station, the fourth data packet according to the fourth sequence number and the second frequency band identifier in a case that the station first receives the third data packet; and removing, by the station, the third data packet according to the third sequence number and the first frequency band identifier in a case that the station first receives the fourth data packet.

In this embodiment, a method of removing a data packet is described by using the station as an example. In some embodiments, the access point transmits the third data packet to the station by using the first frequency band, and transmits the fourth data packet to the station by using the second frequency band. Because transmission efficiency of different frequency bands may be different, the station receives the two data packets at different time. Assuming that no data is lost in the transmission process of the two data packets, when first receiving the third data packet, the station removes the fourth data packet by using the fourth sequence number and the second frequency band identifier. Otherwise, if first receiving the fourth data packet, the station removes the third data packet by using the third sequence number and the first frequency band identifier.

It may be understood that if a data loss occurs in the data packet transmission process, a data packet subject to the data loss removed based on data integrity.

In some embodiments, in this embodiment of this application, the station or the access point may further determine, according to a sequence number and a frequency band identifier that are carried in each data packet, which data packets are removed. If the third data packet is received first, the fourth data packet may be removed according to the fourth sequence number and the second frequency band identifier. If the fourth data packet is received first, the third data packet may be removed according to the third sequence number and the first frequency band identifier. According to the foregoing method, the station or the access point preferentially stores the data packet received earlier, and removes the duplicated data packet received later. In this way, on one hand, data transmission efficiency can be improved, so that the station or the access point can obtain earlier data. On the other hand, a duplicated data packet can be accurately removed by using the frequency band identifier and the sequence number, thereby improving reliability of the solution.

Figure 12:
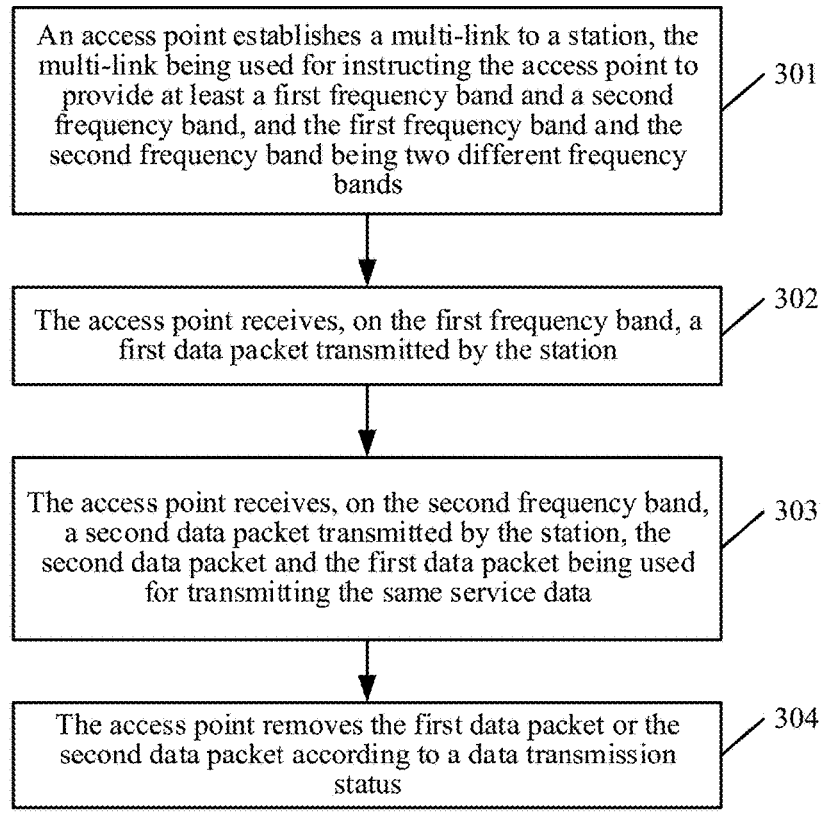
FIG. 12 is a schematic diagram of another embodiment of a data transmission method according to the embodiments of this application.

The following describes the data transmission method in this application from the perspective of an access point. Referring to FIG. 12, an embodiment of the data transmission method according to the embodiments of this application includes the following steps.

301. The access point sets up a multi-link to a station, the multi-link instructing the access point to provide at least a first frequency band and a second frequency band, and the first frequency band and the second frequency band being two different frequency bands.

In this embodiment, a multi-link needs to be first establish between the station and the access point. The multi-link indicates that the station may be connected to the access point having at least two different frequency bands. The two frequency bands include a first frequency band (for example, a 2.4 GHz frequency band) and a second frequency band (for example, a 5 GHz frequency band). Based on capabilities of the station and the access point to work on a plurality of frequency bands at the same time, a specific data flow is duplicated between the station and the access point, transmitted on two different frequency bands or channels to a peer end through multiband operation (MBO) coordination of an SME, and deduplicated at the peer end.

For an operation of establishing the multi-link to the station, reference may be made to content described in step 201 in the foregoing embodiment. Details are not described herein.

302. The access point receives, on the first frequency band, a first data packet transmitted by the station.

In this embodiment, the station may transmit the first data packet to the access point on the first frequency band (for example, the 2.4 GHz frequency band) when the station needs to transmit data to the access point, and the access point receives the first data packet on the first frequency band. Before transmitting the data, the station needs to first obtain, through replication, two data packets carrying the same service data, that is, the first data packet and a second data packet in this embodiment.

303. The access point receives, on the second frequency band, a second data packet transmitted by the station, the second data packet and the first data packet transmitting the same service data.

In this embodiment, the station may transmit the second data packet to the access point on the second frequency band (for example, the 5 GHz frequency band) when the station needs to transmit the data to the access point, and the access point receives the second data packet on the second frequency band. Herein, the second data packet and the first data packet transmit the same service data, but are transmitted on different frequency bands.

A sequence of performing step 302 and step 303 may be that step 302 is performed before step 303 is performed, or step 303 is performed before step 302 is performed, or step 302 and step 303 are simultaneously performed.

304. The access point removes the first data packet or the second data packet according to a data transmission status.

In this embodiment, after receiving the first data packet and the second data packet, the access point selects one of the data packets according to a data transmission status and deletes the data packet, that is, performs deduplication processing on the data packets. Assuming that the first data packet first arrives at the access point, and data in the first data packet is valid, the access point removes the second data packet. Otherwise, assuming that the second data packet first arrives at the access point, and data in the second data packet is valid, the access point removes the first data packet.

It may be understood that if there are three frequency bands, the access point receives three data packets from the station. The three data packets are transmitted to the access point on different frequency bands. The access point needs to determine, according to a transmission status, which two data packets are removed. Certainly, in an actual application, there may be four or more frequency bands, and all the frequency band transmit the same data packet.

In this embodiment of this application, a data transmission method is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 12, in a first optional embodiment of the data transmission method provided in the embodiments of this application, the removing, by the access point, the first data packet or the second data packet according to a data transmission status may include: removing, by the access point, the second data packet according to a second sequence number and a second frequency band identifier in a case that the access point first receives the first data packet; and removing, by the access point, the first data packet according to a first sequence number and a first frequency band identifier in a case that the access point first receives the second data packet.

In this embodiment, a method of removing a data packet is described by using the access point as an example. In some embodiments, the station transmits the first data packet to the access point by using the first frequency band, and transmits the second data packet to the access point by using the second frequency band. Because transmission efficiency of different frequency bands may be different, the access point receives the two data packets at different time. Assuming that no data is lost in the transmission process of the two data packets, when first receiving the first data packet, the access point removes the second data packet by using the second sequence number and the second frequency band identifier. Otherwise, if the access point first receives the second data packet, the access point removes the first data packet by using the first sequence number and the first frequency band identifier.

It may be understood that if a data loss occurs in the data packet transmission process, a data packet subject to the data loss removed based on data integrity.

In addition, in this embodiment of this application, the station or the access point may further determine, according to a sequence number and a frequency band identifier that are carried in each data packet, which data packets are removed. If the first data packet is received first, the second data packet may be removed according to the second sequence number and the second frequency band identifier. If the second data packet is received first, the first data packet may be removed according to the first sequence number and the first frequency band identifier. According to the foregoing method, the station or the access point preferentially stores the data packet received earlier, and removes the duplicated data packet received later. In this way, on one hand, data transmission efficiency can be improved, so that the station or the access point can obtain earlier data. On the other hand, a duplicated data packet can be accurately removed by using the frequency band identifier and the sequence number, thereby improving reliability of the solution.

Figure 13:
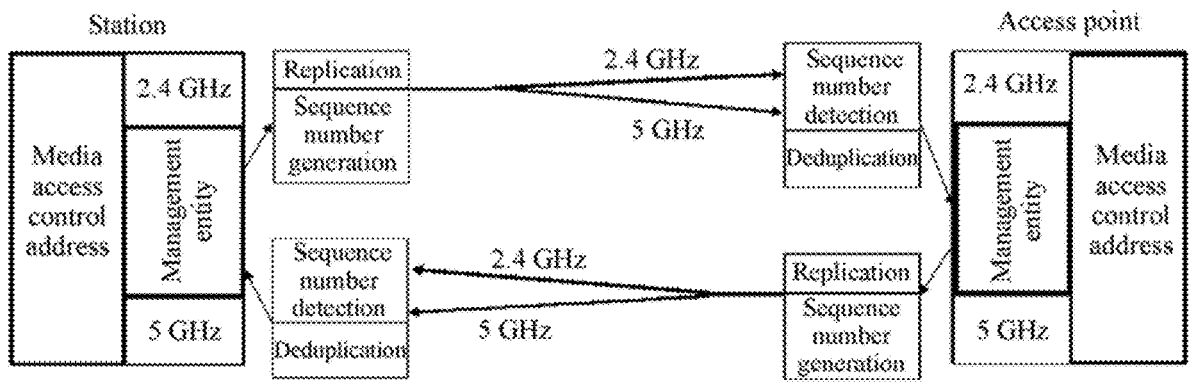
FIG. 13 is a schematic diagram of an embodiment of a data transmission method in an application scenario of this application.

For ease of description, the following specifically describes the data transmission method in this application with reference to FIG. 13. FIG. 13 is a schematic diagram of an embodiment of a data transmission method in an application scenario of this application. As shown in the figure, both a station and an access point support two frequency bands. An example in which the station transmits data packets to the access point is first used. It is assumed that the station generates 10 data packets, and sequence numbers of the 10 data packets are sequentially 0, 1, 2, 3, 4, 5, 6, 7, 8, and 9. The station transmits the 10 data packets to the access point by using each of a 2.4 GHz frequency band and a 5 GHz frequency band. Band IDs of the 10 data packets transmitted on the 2.4 GHz frequency band are 01, and band IDs of the 10 data packets transmitted on the 5 GHz frequency band are 10. After receiving the data packets, the access point sequentially detects the sequence numbers and the band IDs of the 10 data packets, to remove duplicated data packets from different frequency bands. The band ID may be a basic service set identifier (BSSID). A management entity may be an SME, and is responsible for managing enabling and disabling of a multi-link, setup of an FT session, and configuration of sequence numbers of data packets on two frequency bands.

Moreover, retransmission on the two frequency bands conforms to a request to send/clear to send (RTS/CTS) mechanism. When data packets are received, duplicated data packets are removed by using block ACKs according to respective transmission frequency bands. Before the block ACKs are transmitted, it is generally necessary to clean a hidden node by using the CTS, to improve transmission reliability. For acknowledgment of the block ACK, there are two types: an instant acknowledgment and a delayed acknowledgment. The instant acknowledgment is usually completed by hardware, a data packet received by the hardware is mapped to an acknowledgment bitmap, and then response is performed on the data packet. The delayed acknowledgment may be completed by using a protocol stack, and data check may be further completed.

Then, an example in which the access point transmits a data packet to the station is used. It is assumed that the access point generates 10 data packets, and sequence numbers of the 10 data packets are sequentially 0, 1, 2, 3, 4, 5, 6, 7, 8, and 9. The access point transmits the 10 data packets to the station by using each of the 2.4 GHz frequency band and the 5 GHz frequency band. Band IDs of the 10 data packets transmitted on the 2.4 GHz frequency band are 01, and band IDs of the 10 data packets transmitted on the 5 GHz frequency band are 10. After receiving the data packets, the station sequentially detects the sequence numbers and the band IDs of the 10 data packets, to remove duplicated data packets from different frequency bands.

Figure 14:
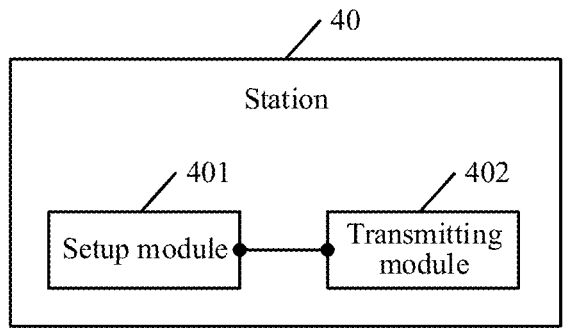
FIG. 14 is a schematic diagram of an embodiment of a station according to the embodiments of this application.

The following describes a corresponding station in the embodiments of this application in detail. FIG. 14 is a schematic diagram of an embodiment of the station according to the embodiments of this application. The station 40 includes: a setup module 401, configured to establish a multi-link to an access point, the multi-link instructing the access point to provide at least a first frequency band and a second frequency band, and the first frequency band and the second frequency band being two different frequency bands; and a transmitting module 402, configured to transmit a first data packet to the access point on the first frequency band, and transmit a second data packet to the access point on the second frequency band, so that the access point removes the first data packet or the second data packet according to a data transmission status, the second data packet and the first data packet transmitting the same service data.

In this embodiment, the setup module 401 sets up a multi-link to an access point, the multi-link instructing the access point to provide at least a first frequency band and a second frequency band, and the first frequency band and the second frequency band being two different frequency bands, and the transmitting module 402 transmits a first data packet to the access point on the first frequency band, and transmits a second data packet to the access point on the second frequency band, so that the access point removes the first data packet or the second data packet according to a data transmission status, the second data packet and the first data packet transmitting the same service data.

In this embodiment of this application, a data transmission method is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 14, in another embodiment of the station 40 provided in the embodiments of this application, the setup module 401 is specifically configured to transmit a first multi-link request to the access point, so that the access point and the station establish a communication connection on the first frequency band; and transmit a second multi-link request to the access point, so that the access point and the station establish a communication connection on the second frequency band.

In addition, in this embodiment of this application, two connections need to be establish between the station and the access point. Specifically, the station transmits the first multi-link request to the access point, and sets up the communication connection on the first frequency band. Next, the station transmits the second multi-link request to the access point, and sets up the communication connection on the second frequency band according to the second multi-link request. According to the foregoing method, a specific implementation is provided for a solution of dual-band connection, thereby ensuring feasibility and operability of the solution.

Figure 15:
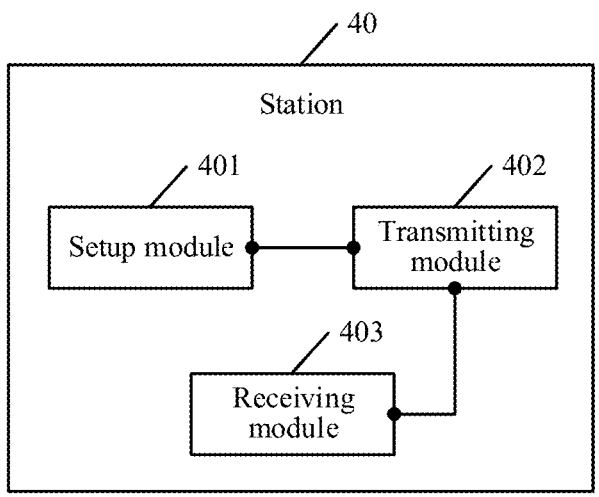
FIG. 15 is a schematic diagram of another embodiment of a station according to the embodiments of this application.

In some embodiments, based on the embodiment corresponding to FIG. 14, referring to FIG. 15, in another embodiment of the station 40 provided in the embodiments of this application, the access point includes a first sub-access point and a second sub-access point.

The station 40 further includes a receiving module 403.

The transmitting module 402 is further configured to transmit a multi-link verification request to the second sub-access point after the station is associated with the first sub-access point.

The receiving module 403 is configured to receive a multi-link verification response transmitted by the second sub-access point.

The transmitting module 402 is further configured to transmit a multi-link association request to the second sub-access point.

The receiving module 403 is further configured to receive a multi-link association response transmitted by the second sub-access point, the multi-link association response being using for associating the first frequency band with the second frequency band.

In addition, in this embodiment of this application, a method of authentication between a station and an access point is described. To be specific, the station transmits a multi-link verification request to a second sub-access point, then the access point transmits a multi-link verification response to the station by using the second sub-access point, then the station transmits a multi-link association request to the second sub-access point, and finally the access point transmits a multi-link association response to the station by using the second sub-access point. The multi-link association response associating a first frequency band with a second frequency band. According to the foregoing method, authentication further needs to be performed between the station and the access point, to verify an identity of a user and an available network service, and the network service is opened to the station according to an authentication result, thereby improving network reliability and security.

In some embodiments, based on the embodiment corresponding to FIG. 15, in another embodiment of the station 40 provided in the embodiments of this application, the transmitting module 402 is specifically configured to transmit a multi-link setup request to the access point; receive a multi-link setup response transmitted by the access point; transmit a multi-link acknowledgment request to the access point; and receive a multi-link acknowledgment response transmitted by the access point, so that the access point and the station establish a communication connection on the second frequency band.

In some embodiments, in this embodiment of this application, a method of establishing a dual-link between a station and an access point is provided. To be specific, the station transmits a multi-link setup request to the access point, the access point transmits a multi-link setup response to the station, the station transmits a multi-link acknowledgment request to the access point, and the access point transmits a multi-link acknowledgment response to the station, so that the access point and the station establish a communication connection on the second frequency band. According to the foregoing method, a connection further needs to be establish between the station and the access point, and the entire dual-link process may be completed through interaction between the station and the access point, thereby ensuring practicality and feasibility of the solution.

In some embodiments, based on the embodiment corresponding to FIG. 14, in another embodiment of the station 40 provided in the embodiments of this application, the setup module 401 is specifically configured to receive a multi-link enabling request transmitted by the access point, the multi-link enabling request being generated by the access point according to a target service, and the target service satisfying a multi-link enabling condition; transmit a first multi-link request to the access point according to the multi-link enabling request, so that the access point and the station establish a communication connection on the first frequency band; and transmit a second multi-link request to the access point according to the multi-link enabling request, so that the access point and the station establish a communication connection on the second frequency band.

In addition, in this embodiment of this application, the station may further receive the multi-link enabling request transmitted by the access point, the multi-link enabling request being generated by the access point according to the target service, and the target service satisfying the multi-link enabling condition. Next, the station transmits the first multi-link request to the access point according to the multi-link enabling request, and sets up the first multi-link request by using the first multi-link request. Then the station transmits the second multi-link request to the access point according to the multi-link enabling request, and sets up the second multi-link request according to the second multi-link request. According to the foregoing method, the access point supporting the dual-link may actively detect service traffic. When the service traffic belongs to a high-latency application, the access point may actively request the station to enable the dual-link function. Therefore, another feasible method is provided for implementation of the solution, and flexibility of the solution is improved.

In some embodiments, based on the embodiment corresponding to FIG. 14, in another embodiment of the station

40 provided in the embodiments of this application, the first data packet carries a first sequence number and a first frequency band identifier, the first sequence number indicating an occurrence order of the first data packet, and the first frequency band identifier indicating the first frequency band.

The second data packet carries a second sequence number and a second frequency band identifier, the second sequence number indicating an occurrence order of the second data packet, and the second frequency band identifier indicating the second frequency band.

In addition, in this embodiment of this application, a data packet composition method is provided. To be specific, a header of a data packet carries a sequence number and a frequency band identifier, the frequency band identifier determining a frequency band the data packet is transmitted on, and the sequence number determining a transmission order of the data packet. According to the foregoing method, the station or the access point may determine a deduplication object by parsing the data packet, thereby improving reliability and accuracy of deduplication.

Figure 16:
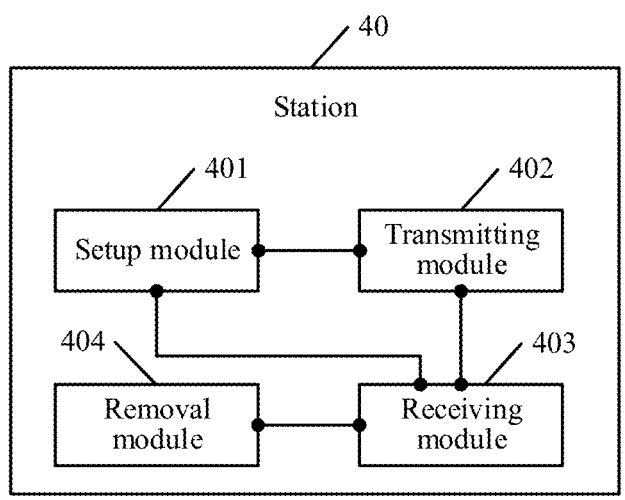
FIG. 16 is a schematic diagram of another embodiment of a station according to the embodiments of this application.

In some embodiments, based on the embodiment corresponding to FIG. 14 or FIG. 15, referring to FIG. 16, in another embodiment of the station 40 provided in the embodiments of this application, the station 40 further includes a removal module 404.

The receiving module 403 is further configured to: after the setup module 401 sets up the multi-link to the access point, receive, on the first frequency band, a third data packet transmitted by the access point, the third data packet carrying a third sequence number and the first frequency band identifier, the third sequence number indicating an occurrence order of the third data packet, and the first frequency band identifier indicating the first frequency band.

The receiving module 403 is further configured to receive, on the second frequency band, a fourth data packet transmitted by the access point, the fourth data packet and the third data packet being using for transmitting the same service data, a fourth sequence number indicating an occurrence order of the fourth data packet, and the second frequency band identifier indicating the second frequency band.

The removal module 404 is configured to remove, according to a data transmission status, the third data packet or the fourth data packet received by the receiving module 403.

In some embodiments, in this embodiment of this application, a data transmission method is provided. First, a multi-link is establish between a station and an access point, the multi-link instructing the access point to provide at least a first frequency band and a second frequency band, and the first frequency band and the second frequency band being two different frequency bands. Then the access point transmits a third data packet to the station on the first frequency band and transmits a fourth data packet to the station on the second frequency band, and the station receives, on the first frequency band, the third data packet transmitted by the access point and receives, on the second frequency band, the fourth data packet transmitted by the access point, and removes the third data packet or the fourth data packet according to a data transmission status, the third data packet and the fourth data packet transmitting the same service data. According to the foregoing method, the access point transmits the same data packet to the station by using different frequency bands, and the station determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 16, in another embodiment of the station 40 provided in the embodiments of this application, the removal module 404 is specifically configured to remove the fourth data packet according to the fourth sequence number and the second frequency band identifier in a case that the station first receives the third data packet; and remove the third data packet according to the third sequence number and the first frequency band identifier in a case that the station first receives the fourth data packet.

In some embodiments, in this embodiment of this application, the station or the access point may further determine, according to a sequence number and a frequency band identifier that are carried in each data packet, which data packets are removed. If the third data packet is received first, the fourth data packet may be removed according to the fourth sequence number and the second frequency band identifier. If the fourth data packet is received first, the third data packet may be removed according to the third sequence number and the first frequency band identifier. According to the foregoing method, the station or the access point preferentially stores the data packet received earlier, and removes the duplicated data packet received later. In this way, on one hand, data transmission efficiency can be improved, so that the station or the access point can obtain earlier data. On the other hand, a duplicated data packet can be accurately removed by using the frequency band identifier and the sequence number, thereby improving reliability of the solution.

Figure 17:
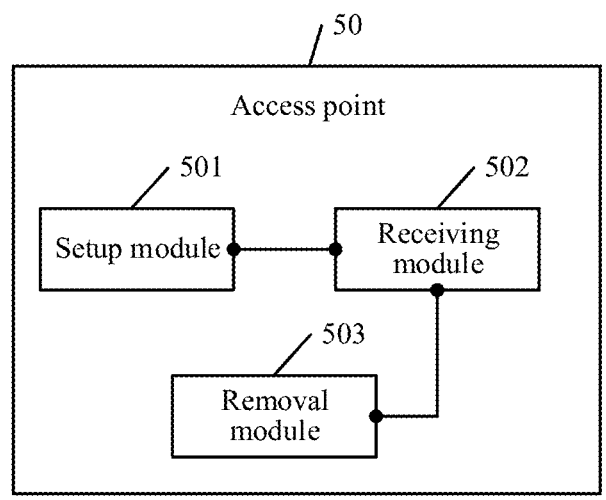
FIG. 17 is a schematic diagram of an embodiment of an access point according to the embodiments of this application.

The corresponding station in the embodiments of this application is described in detail above. The following describes a corresponding access point in the embodiments of this application in detail. FIG. 17 is a schematic diagram of an embodiment of the access point according to the embodiments of this application. The access point 50 includes: a setup module 501, configured to establish a multi-link to a station, the multi-link instructing the access point to provide at least a first frequency band and a second frequency band, and the first frequency band and the second frequency band being two different frequency bands; a receiving module 502, configured to receive, on the first frequency band, a first data packet transmitted by the station, and receive, on the second frequency band, a second data packet transmitted by the station, the second data packet and the first data packet transmitting the same service data; and a removal module 503, configured to remove, according to a data transmission status, the first data packet or the second data packet received by the receiving module 502.

In this embodiment, the setup module 501 sets up a multi-link to a station, the multi-link instructing the access point to provide at least a first frequency band and a second frequency band, and the first frequency band and the second frequency band being two different frequency bands, the receiving module 502 receives, on the first frequency band, a first data packet transmitted by the station, and receives, on the second frequency band, a second data packet transmitted by the station, the second data packet and the first data packet transmitting the same service data, and the removal module 503 removes, according to a data transmission status, the first data packet or the second data packet received by the receiving module 502.

In this embodiment of this application, a data transmission method is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 17, in another embodiment of the access point 50 provided in the embodiments of this application, the setup module 501 is specifically configured to receive a first multi-link request transmitted by the station; establish a communication connection to the station on the first frequency band according to the first multi-link request; receive a second multi-link request transmitted by the station; and establish a communication connection to the station on the second frequency band according to the second multi-link request.

In addition, in this embodiment of this application, two connections need to be establish between the station and the access point. Specifically, the station transmits the first multi-link request to the access point, and sets up the communication connection on the first frequency band. Next, the station transmits the second multi-link request to the access point, and sets up the communication connection on the second frequency band according to the second multi-link request. According to the foregoing method, a specific implementation is provided for a solution of dual-band connection, thereby ensuring feasibility and operability of the solution.

Figure 18:
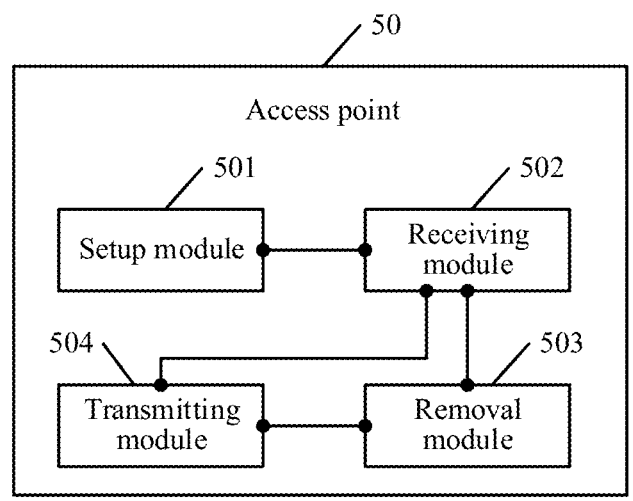
FIG. 18 is a schematic diagram of another embodiment of an access point according to the embodiments of this application.

In some embodiments, based on the embodiment corresponding to FIG. 17, referring to FIG. 18, in another embodiment of the access point 50 provided in the embodiments of this application, the access point includes a first sub-access point and a second sub-access point.

The access point 50 further includes a transmitting module 504.

The receiving module 502 is further configured to receive, by using the second sub-access point, a multi-link verification request transmitted by the station after the station is associated with the first sub-access point.

The transmitting module 504 is configured to transmit a multi-link verification response to the station by using the second sub-access point.

The receiving module 502 is further configured to receive, by using the second sub-access point, a multi-link association request transmitted by the station.

The transmitting module 504 is further configured to transmit a multi-link association response to the station by using the second sub-access point, the multi-link association response being using for associating the first frequency band with the second frequency band.

In addition, in this embodiment of this application, a method of authentication between a station and an access point is described. To be specific, the station transmits a multi-link verification request to a second sub-access point, then the access point transmits a multi-link verification response to the station by using the second sub-access point, then the station transmits a multi-link association request to the second sub-access point, and finally the access point transmits a multi-link association response to the station by using the second sub-access point. The multi-link association response associating a first frequency band with a second frequency band. According to the foregoing method, authentication further needs to be performed between the station and the access point, to verify an identity of a user and an available network service, and the network service is opened to the station according to an authentication result, thereby improving network reliability and security.

In some embodiments, based on the embodiment corresponding to FIG. 18, in another embodiment of the access point 50 provided in the embodiments of this application, the transmitting module 504 is specifically configured to receive a multi-link setup request transmitted by the station; transmit a multi-link setup response to the station; receive a multi-link acknowledgment request transmitted by the station; and transmit a multi-link acknowledgment response to the station.

In some embodiments, in this embodiment of this application, a method of establishing a dual-link between a station and an access point is provided. To be specific, the station transmits a multi-link setup request to the access point, the access point transmits a multi-link setup response to the station, the station transmits a multi-link acknowledgment request to the access point, and the access point transmits a multi-link acknowledgment response to the station, so that the access point and the station establish a communication connection on the second frequency band. According to the foregoing method, a connection further needs to be establish between the station and the access point, and the entire dual-link process may be completed through interaction between the station and the access point, thereby ensuring practicality and feasibility of the solution.

In some embodiments, based on the embodiment corresponding to FIG. 18, in another embodiment of the access point 50 provided in the embodiments of this application, the setup module 501 is specifically configured to transmit a multi-link enabling request to the station in a case that the access point detects a target service, the target service satisfying a multi-link enabling condition; receive, according to the multi-link enabling request, a first multi-link request transmitted by the station; establish a communication connection to the station on the first frequency band according to the first multi-link request; receive, according to the multi-link enabling request, a second multi-link request transmitted by the station; and establish a communication connection to the station on the second frequency band according to the second multi-link request.

In addition, in this embodiment of this application, the station may further receive the multi-link enabling request transmitted by the access point, the multi-link enabling request being generated by the access point according to the target service, and the target service satisfying the multi-link enabling condition. Next, the station transmits the first multi-link request to the access point according to the multi-link enabling request, and sets up the first multi-link request by using the first multi-link request. Then the station transmits the second multi-link request to the access point according to the multi-link enabling request, and sets up the second multi-link request according to the second multi-link request. According to the foregoing method, the access point supporting the dual-link may actively detect service traffic. When the service traffic belongs to a high-latency application, the access point may actively request the station to enable the dual-link function. Therefore, another feasible method is provided for implementation of the solution, and flexibility of the solution is improved.

In some embodiments, based on the embodiment corresponding to FIG. 17, in another embodiment of the access point 50 provided in the embodiments of this application, the first data packet carries a first sequence number and a first frequency band identifier, the first sequence number indicating an occurrence order of the first data packet, and the first frequency band identifier indicating the first frequency band.

The second data packet carries a second sequence number and a second frequency band identifier, the second sequence number indicating an occurrence order of the second data packet, and the second frequency band identifier indicating the second frequency band.

In addition, in this embodiment of this application, a data packet composition method is provided. To be specific, a header of a data packet carries a sequence number and a frequency band identifier, the frequency band identifier determining a frequency band the data packet is transmitted on, and the sequence number determining a transmission order of the data packet. According to the foregoing method, the station or the access point may determine a deduplication object by parsing the data packet, thereby improving reliability and accuracy of deduplication.

In some embodiments, based on the embodiment corresponding to FIG. 17 or FIG. 18, in another embodiment of the access point 50 provided in the embodiments of this application, the transmitting module 504 is further configured to transmit a third data packet to the station on the first frequency band after the setup module 501 sets up the multi-link to the station; and transmit a fourth data packet to the station on the second frequency band, so that the station removes the third data packet or the fourth data packet according to a data transmission status, the fourth data packet and the third data packet transmitting the same service data.

In some embodiments, in this embodiment of this application, a data transmission method is provided. First, a multi-link is establish between a station and an access point, the multi-link instructing the access point to provide at least a first frequency band and a second frequency band, and the first frequency band and the second frequency band being two different frequency bands. Then the access point transmits a third data packet to the station on the first frequency band and transmits a fourth data packet to the station on the second frequency band, and the station receives, on the first frequency band, the third data packet transmitted by the access point and receives, on the second frequency band, the fourth data packet transmitted by the access point, and removes the third data packet or the fourth data packet according to a data transmission status, the third data packet and the fourth data packet transmitting the same service data. According to the foregoing method, the access point transmits the same data packet to the station by using different frequency bands, and the station determines, according to a data transmission status, which duplicated data packet needs to be removed, to improve network stability between the station and the access point and avoid delayed arrival or loss of the data packet due to an extremely high instantaneous delay, thereby improving network reliability.

In some embodiments, based on the embodiment corresponding to FIG. 17, in another embodiment of the access point 50 provided in the embodiments of this application, the removal module 503 is specifically configured to remove the second data packet according to the second sequence number and the second frequency band identifier in a case that the access point first receives the first data packet; and remove the first data packet according to the first sequence number and the first frequency band identifier in a case that the access point first receives the second data packet.

In addition, in this embodiment of this application, the station or the access point may further determine, according to a sequence number and a frequency band identifier that are carried in each data packet, which data packets are removed. If the first data packet is received first, the second data packet may be removed according to the second sequence number and the second frequency band identifier. If the second data packet is received first, the first data packet may be removed according to the first sequence number and the first frequency band identifier. According to the foregoing method, the station or the access point preferentially stores the data packet received earlier, and removes the duplicated data packet received later. In this way, on one hand, data transmission efficiency can be improved, so that the station or the access point can obtain earlier data. On the other hand, a duplicated data packet can be accurately removed by using the frequency band identifier and the sequence number, thereby improving reliability of the solution.

Figure 19:
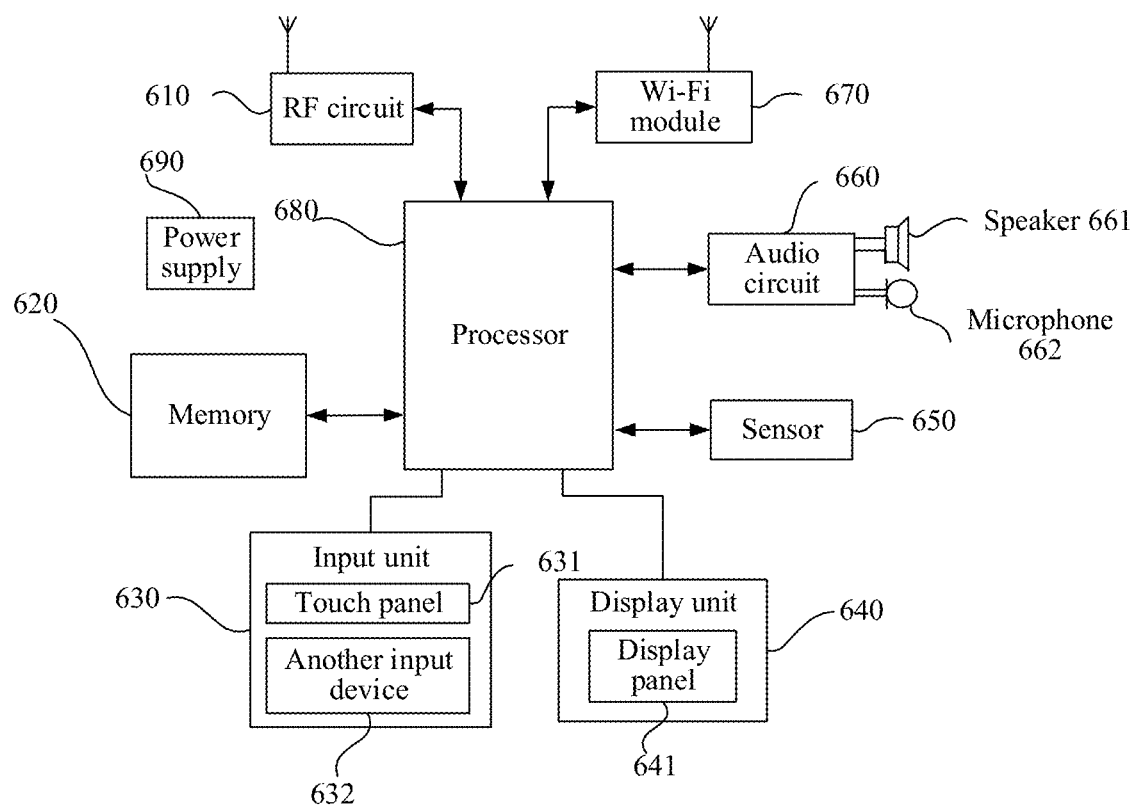
FIG. 19 is a schematic structural diagram of a station according to the embodiments of the present application.

An embodiment of this application further provides another station. As shown in FIG. 19, for ease of description, only parts related to this embodiment of this application are shown. For specific technical details that are not disclosed, reference may be made to the method part of the embodiments of this application. The station may be any terminal device including any terminal device such as a mobile phone, a tablet computer, a personal digital assistant (PDA), a point of sales (POS), and an on-board computer. For example, the station is a mobile phone.

FIG. 19 is a block diagram of a structure of a part of a mobile phone related to a terminal according to the embodiments of this application. Referring to FIG. 19, the mobile phone includes components such as: a radio frequency (RF) circuit 610, a memory 620, an input unit 630, a display unit 640, a sensor 650, an audio circuit 660, a Wi-Fi module 670, a processor 680, and a power supply 690. A person skilled in the art may understand that the structure of the mobile phone shown in FIG. 19 does not constitute a limitation on the mobile phone, and the mobile phone may include more components or fewer components than those shown in the figure, or some components may be combined, or a different component deployment may be used.

The following specifically describes the components of the mobile phone with reference to FIG. 19.

The RF circuit 610 may be configured to receive and transmit signals during an information receiving and transmitting process or a call process. Specifically, the RF circuit receives downlink information from a base station, then delivers the downlink information to the processor 680 for processing, and transmits designed uplink data to the base station. Usually, the RF circuit 610 includes, but is not limited to, an antenna, at least one amplifier, a transceiver, a coupler, a low noise amplifier (LNA), and a duplexer. In addition, the RF circuit 610 may also communicate with a network and another device by wireless communication. Any communication standard or protocol may be used for the wireless communication, and includes, but is not limited to, global system for mobile communications (GSM), general packet radio service (GPRS), code division multiple access (CDMA), wideband code division multiple access (WCDMA), long term evolution (LTE), new radio (5G NR), email, short message service (SMS), and the like.

The memory 620 may be configured to store a software program and module. The processor 680 runs the software program and module stored in the memory 620, to perform various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 620 may include a high-speed random access memory (RAM), and may further include a non-volatile memory such as at least one disk storage device, a flash memory device, or another volatile solid-state storage device.

The input unit 630 may be configured to receive input digit or character information, and generate keyboard signal input related to a user setting and function control of the mobile phone. In some embodiments, the input unit 630 may include a touch panel 631 and another input device 632. The touch panel 631, also referred to as a touchscreen, may collect a touch operation that is performed by a user on or near the touch panel 631 (for example, an operation that is performed by a user by using any appropriate object or accessory such as a finger or a stylus on or near the touch panel 631), and drive a corresponding connection apparatus according to a preset program. In some embodiments, the touch panel 631 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 680. Moreover, the touch controller can receive and execute a command transmitted from the processor 680. In addition, the touch panel 631 may be implemented by using various types such as a resistive type, a capacitance type, an infrared type, and a surface acoustic wave type. In addition to the touch panel 631, the input unit 630 may further include another input device 632. In some embodiments, another input device 632 may include but is not limited to one or more of a physical keyboard, a functional key (for example, a volume control key or a switch key), a track ball, a mouse, and a joystick.

The display unit 640 may be configured to display information entered by the user or information provided for the user, and various menus of the mobile phone. The display unit 640 may include a display panel 641. In some embodiments, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel transfers the touch operation to the processor 680, to determine a type of a touch event. Then, the processor 680 provides a corresponding visual output on the display panel 641 according to the type of the touch event. Although, in FIG. 19, the touch panel 631 and the display panel 641 are used as two separate parts to implement input and input functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. In some embodiments, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an accelerometer sensor may detect magnitude of accelerations in various directions (usually on three axes), may detect magnitude and a direction of the gravity when static, and may be configured to identify an application of a mobile phone gesture (such as switchover between horizontal and vertical screens, a related game, and magnetometer posture calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 660, a speaker 661, and a microphone 662 may provide audio interfaces between the user and the mobile phone. The audio circuit 660 may convert received audio data into an electrical signal and transmit the electrical signal to the speaker 661. The speaker 661 converts the electrical signal into a sound signal for output. On the other hand, the microphone 662 converts a collected sound signal into an electrical signal. The audio circuit 660 receives the electrical signal, converts the electrical signal into audio data, and outputs the audio data to the processor 680 for processing. Then, the processor transmits the audio data to, for example, another mobile phone by using the RF circuit 610, or outputs the audio data to the memory 620 for further processing.

Wi-Fi belongs to a short distance wireless transmission technology. The mobile phone may help, by using the Wi-Fi module 670, a user to receive and transmit an email, browse a web page, access stream media, and the like. This provides wireless broadband Internet access for the user. Although FIG. 19 shows the Wi-Fi module 670, it may be understood that the Wi-Fi module is not a necessary component of the mobile phone, and the Wi-Fi module may be omitted as required provided that the scope of the essence of this application is not changed.

The processor 680 is a control center of the mobile phone, and is connected to various parts of the entire mobile phone by using various interfaces and lines. By running or executing a software program and/or module stored in the memory 620, and invoking data stored in the memory 620, the processor 680 executes various functions of the mobile phone and performs data processing, thereby monitoring the entire mobile phone. In some embodiments, the processor 680 may include one or more processing units. In some embodiments, the processor 680 may integrate an application processor and a modem processor. The application processor mainly processes an operating system, a user interface, an application program, and the like. The modem processor mainly processes wireless communication. It may be understood that the modem may not be integrated into the processor 680.

The mobile phone further includes the power supply 690 (such as a battery) for supplying power to the components. In some embodiments, the power supply may be logically connected to the processor 680 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 680 included in the terminal further has the following functions: establishing a multi-link to an access point, the multi-link instructing the access point to provide at least a first frequency band and a second frequency band, and the first frequency band and the second frequency band being two different frequency bands; transmitting a first data packet to the access point on the first frequency band; and transmitting a second data packet to the access point on the second frequency band, so that the access point removes the first data packet or the second data packet according to a data transmission status, the second data packet and the first data packet transmitting the same service data.

In some embodiments, the processor 680 is specifically configured to perform the following steps: transmitting a first multi-link request to the access point, so that the access point and the station establish a communication connection on the first frequency band; and transmitting a second multi-link request to the access point, so that the access point and the station establish a communication connection on the second frequency band.

In some embodiments, the processor 680 is further configured to perform the following steps: transmitting a multi-link verification request to a second sub-access point; receiving a multi-link verification response transmitted by the second sub-access point; transmitting a multi-link association request to the second sub-access point; and receiving a multi-link association response transmitted by the second sub-access point, the multi-link association response being using for associating the first frequency band with the second frequency band.

In some embodiments, the processor 680 is specifically configured to perform the following steps: transmitting a multi-link setup request to the access point; receiving a multi-link setup response transmitted by the access point; transmitting a multi-link acknowledgment request to the access point; and receiving a multi-link acknowledgment response transmitted by the access point, so that the access point and the station establish a communication connection on the second frequency band.

In some embodiments, the processor 680 is specifically configured to perform the following steps: receiving a multi-link enabling request transmitted by the access point, the multi-link enabling request being generated by the access point according to a target service, and the target service satisfying a multi-link enabling condition; transmitting a first multi-link request to the access point according to the multi-link enabling request, so that the access point and the station establish a communication connection on the first frequency band; and transmitting a second multi-link request to the access point according to the multi-link enabling request, so that the access point and the station establish a communication connection on the second frequency band.

In some embodiments, the processor 680 is further configured to perform the following steps: receiving, on the first frequency band, a third data packet transmitted by the access point, the third data packet carrying a third sequence number and the first frequency band identifier, the third sequence number indicating an occurrence order of the third data packet, and the first frequency band identifier indicating the first frequency band; receiving, on the second frequency band, a fourth data packet transmitted by the access point, the fourth data packet and the third data packet being using for transmitting the same service data, a fourth sequence number indicating an occurrence order of the fourth data packet, and the second frequency band identifier indicating the second frequency band; and removing the third data packet or the fourth data packet according to a data transmission status.

In some embodiments, the processor 680 is specifically configured to perform the following steps: removing the fourth data packet according to the fourth sequence number and the second frequency band identifier in a case that the station first receives the third data packet; and removing the third data packet according to the third sequence number and the first frequency band identifier in a case that the station first receives the fourth data packet.

Figure 20:
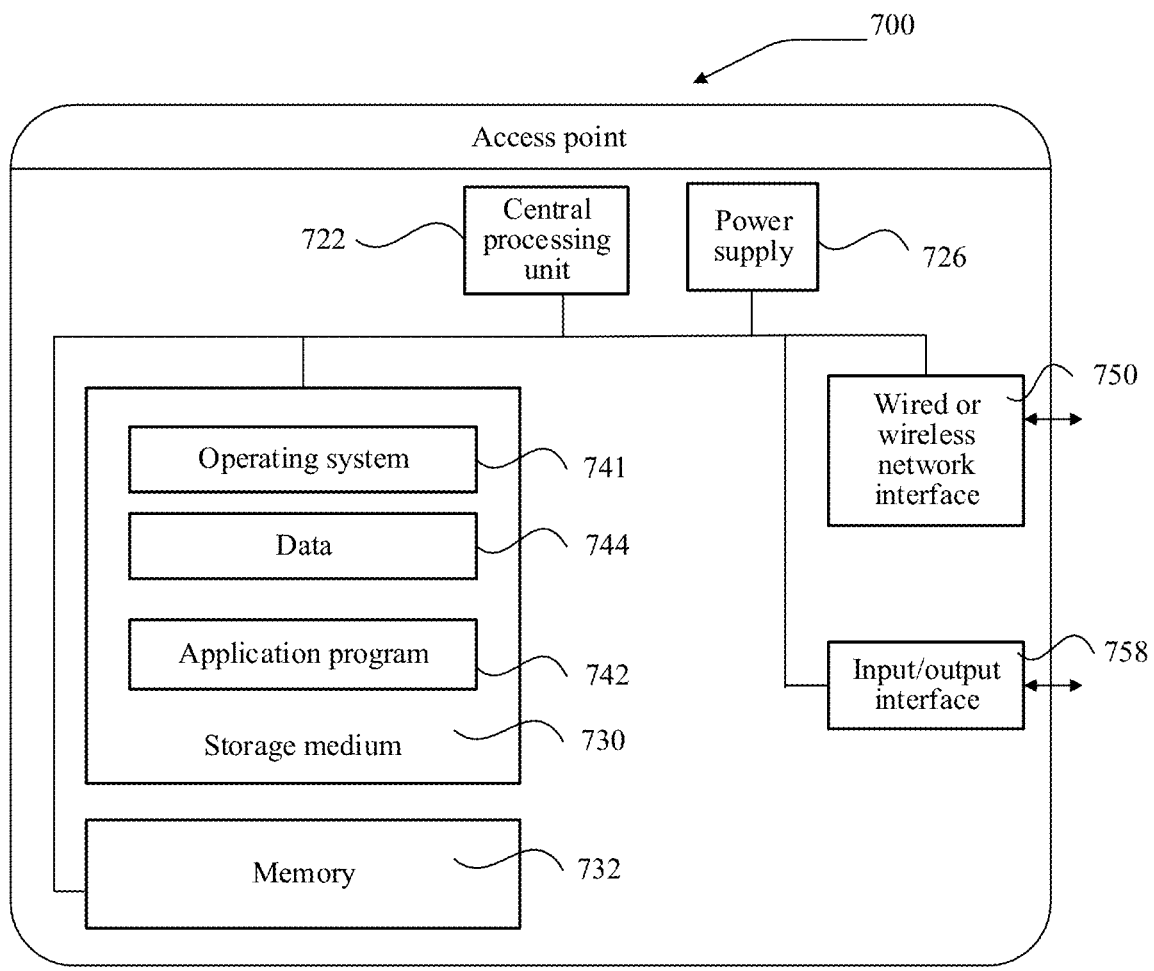
FIG. 20 is a schematic structural diagram of an access point according to the embodiments of this application.

FIG. 20 is a schematic structural diagram of an access point according to the embodiments of this application. The access point 700 may vary greatly due to different configurations or performance, and may include one or more central processing units (CPUs) 722 (for example, one or more processors) and a memory 732, and one or more storage media 730 (for example, one or more mass storage devices) that store an application program 742 or data 744. The memory 732 and the storage medium 730 may be transient storage or persistent storage. The program stored in the storage medium 730 may include one or more modules (not marked in the figure), and each module may include a series of instruction operations to the access point. In some embodiments, the CPU 722 may be set to communicate with the storage medium 730, and executes, on the access point 700, a series of instruction operations in the storage medium 730.

The access point 700 may further include one or more power supplies 726, one or more wired or wireless network interfaces 750, one or more input/output interfaces 758, and/or one or more operating systems 741, for example, Windows Server®, Mac OS®, Unix®, Linux®, and FreeBSD®.

The steps performed by the access point in the foregoing embodiment may be based on the structure of the access point shown in FIG. 20.

In this embodiment of this application, the CPU 722 included in the access point further has the following functions: establishing a multi-link to a station, the multi-link instructing the access point to provide at least a first frequency band and a second frequency band, and the first frequency band and the second frequency band being two different frequency bands; receiving, on the first frequency band, a first data packet transmitted by the station; receiving, on the second frequency band, a second data packet transmitted by the station, the second data packet and the first data packet transmitting the same service data; and removing the first data packet or the second data packet according to a data transmission status.

In some embodiments, the CPU 722 is specifically configured to perform the following steps: receiving a first multi-link request transmitted by the station; establishing a communication connection to the station on the first frequency band according to the first multi-link request; receiving a second multi-link request transmitted by the station; and establishing a communication connection to the station on the second frequency band according to the second multi-link request.

In some embodiments, the CPU 722 is further configured to perform the following steps: receiving, by using a second sub-access point, a multi-link verification request transmitted by the station; transmitting a multi-link verification response to the station by using the second sub-access point; receiving, by using the second sub-access point, a multi-link association request transmitted by the station; and transmitting a multi-link association response to the station by using the second sub-access point, the multi-link association response being using for associating the first frequency band with the second frequency band.

In some embodiments, the CPU 722 is specifically configured to perform the following steps: receiving a multi-link setup request transmitted by the station; transmitting a multi-link setup response to the station; receiving a multi-link acknowledgment request transmitted by the station; and transmitting a multi-link acknowledgment response to the station.

In some embodiments, the CPU 722 is specifically configured to perform the following steps: transmitting a multi-link enabling request to the station in a case that a target service is detected, the target service satisfying a multi-link enabling condition; receiving, according to the multi-link enabling request, a first multi-link request transmitted by the station; establishing a communication connection to the station on the first frequency band according to the first multi-link request; receiving, according to the multi-link enabling request, a second multi-link request transmitted by the station; and establishing a communication connection to the station on the second frequency band according to the second multi-link request.

In some embodiments, the CPU 722 is further configured to perform the following steps: transmitting a third data packet to the station on the first frequency band; and transmitting a fourth data packet to the station on the second frequency band, so that the station removes the third data packet or the fourth data packet according to a data transmission status, the fourth data packet and the third data packet transmitting the same service data.

In some embodiments, the CPU 722 is specifically configured to perform the following steps: removing the second data packet according to a second sequence number and a second frequency band identifier in a case that the access point first receives the first data packet; and removing the first data packet according to the first sequence number and the first frequency band identifier in a case that the access point first receives the second data packet.

Figure 21:
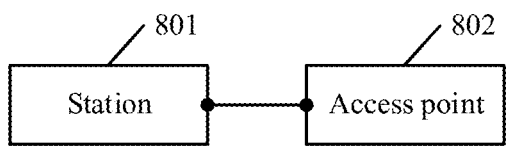
FIG. 21 is a schematic diagram of an embodiment of a data transmission system according to the embodiments of this application.

FIG. 21 is a schematic diagram of an embodiment of a data transmission system according to the embodiments of this application. As shown in the figure, an embodiment of the data transmission system according to the embodiments of this application includes: a station 801 and an access point 802.

In this embodiment, the station 801 sets up a multi-link to the access point, the multi-link instructing the access point to provide at least a first frequency band and a second frequency band, and the first frequency band and the second frequency band being two different frequency bands, and the station transmits a first data packet to the access point on the first frequency band, and transmits a second data packet to the access point on the second frequency band, so that the access point removes the first data packet or the second data packet according to a data transmission status, the second data packet and the first data packet transmitting the same service data.

In this embodiment of this application, a data transmission system is provided. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

All or some of the foregoing embodiments may be implemented by means of software, hardware, firmware, or any combination thereof. When software implementation, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website station, computer, server, or data center to another website station, computer, server, or data center in a wired (for example, a coaxial cable, an optical fiber, or a digital subscriber line) or wireless (for example, infrared, radio, and microwave, or the like) method. The computer-readable storage medium may be any usable medium that can be stored in a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, an SSD), or the like.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the embodiments provided in this application, it is to be understood that the disclosed system, apparatus, and method may be implemented in other methods. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a RAM, a magnetic disk, or a compact disc.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of this application.

INDUSTRIAL APPLICABILITY

Embodiments of this application provide a data transmission method. First, a station sets up a multi-link to an access point, the multi-link instructing the access point to provide at least a first frequency band and a second frequency band, and the first frequency band and the second frequency band being two different frequency bands. Then the station may transmit a first data packet to the access point on the first frequency band and transmit a second data packet to the access point on the second frequency band, so that the access point removes the first data packet or the second data packet according to a data transmission status, the second data packet and the first data packet transmitting the same service data. According to the foregoing method, the station transmits the same data packet to the access point by using different frequency bands, and the access point determines, according to a data transmission status, which duplicated data packet needs to be removed, to improve network stability between the station and the access point and avoid delayed arrival or loss of the data packet due to an extremely high instantaneous delay, thereby improving network reliability.

What is claimed is:

1. A data transmission method, comprising:
    establishing, by a station, a multi-link to an access point, the multi-link instructing the access point to provide at least a first frequency band and a second frequency band, and the first frequency band and the second frequency band being two different frequency bands;
    transmitting, by the station, a first data packet to the access point on the first frequency band; and
    transmitting, by the station, a second data packet to the access point on the second frequency band, wherein the access point removes the first data packet or the second data packet, wherein a header of the first data packet or the second data packet includes a sequence control field, and the sequence control field carries:
    a 12-bit sequence number, a 3-bit band ID, and a 1-bit dual link indicator.

2. The method according to claim 1, wherein the establishing, by a station, a multi-link to an access point comprises:
    transmitting, by the station, a first multi-link request to the access point;
    establishing, by the access point and the station, a communication connection on the first frequency band; and
    transmitting, by the station, a second multi-link request to the access point;
    establishing, by the access point and the station, a communication connection on the second frequency band.

3. The method according to claim 2, wherein the access point comprises a first sub-access point and a second sub-access point, and the transmitting, by the station, a first multi-link request to the access point comprises:
    transmitting, by the station, a multi-link verification request to the second sub-access point after the station is associated with the first sub-access point;
    receiving, by the station, a multi-link verification response transmitted by the second sub-access point; transmitting, by the station, a multi-link association request to the second sub-access point; and
    receiving, by the station, a multi-link association response transmitted by the second sub-access point, the multi-link association response associating the first frequency band with the second frequency band.

4. The method according to claim 3, wherein the transmitting, by the station, a second multi-link request to the access point; establishing, by the access point and the station, a communication connection on the second frequency band comprises:
    transmitting, by the station, a multi-link setup request to the access point;
    receiving, by the station, a multi-link setup response transmitted by the access point;
    transmitting, by the station, a multi-link acknowledgment request to the access point; and
    receiving, by the station, a multi-link acknowledgment response transmitted by the access point, and establishing, by the access point and the station, the communication connection on the second frequency band.

5. The method according to claim 1, wherein after the establishing, by a station, a multi-link to an access point, the method further comprises:
    receiving, by the station on the first frequency band, a third data packet transmitted by the access point, the third data packet carrying a third sequence number and the first frequency band identifier, the third sequence number indicating an occurrence order of the third data packet, and the first frequency band identifier indicating the first frequency band;
    receiving, by the station on the second frequency band, a fourth data packet transmitted by the access point, the fourth data packet and the third data packet being using for transmitting the same service data, a fourth sequence number indicating an occurrence order of the fourth data packet, and the second frequency band identifier indicating the second frequency band; and removing, by the station, the third data packet or the fourth data packet.

6. The method according to claim 5, wherein the removing, by the station, the third data packet or the fourth data packet comprises:

determining, by the station, the station receives the third data packet ahead of the four data packet; and removing, by the station, the fourth data packet.

7. The method according to claim 6, wherein the removing, by the station, the third data packet or the fourth data packet comprises:

determining, by the station, the station receives the fourth data packet ahead of the third data packet; and removing, by the station, the third data packet.

8. The method according to claim 1, wherein the dual-link indicator is represented by 0 or 1, 0 indicates the dual-link function is disabled, and 1 indicates the dual-link function is enabled.

9. The method according to claim 1, further comprising:

determining, by the access point, a throughput of a service less than a first preset threshold and a network latency of the service is greater than a second preset threshold;

determining, by the access point, the service is a target service; and sending, by the access point, a multi-link enabling request to the station.

10. A station, comprising: a memory and a processor, the memory being configured to store a program; when executing the program in the memory, the processor being configured to:

establish a multi-link to an access point, the multi-link instructing the access point to provide at least a first frequency band and a second frequency band, and the first frequency band and the second frequency band being two different frequency bands;

transmit a first data packet to the access point on the first frequency band; and transmit a second data packet to the access point on the second frequency band, the access point removing the first data packet or the second data packet, wherein a header of the first data packet or the second data packet includes a sequence control field, and the sequence control field carries:

a 12-bit sequence number, a 3-bit band ID, and a 1-bit dual link indicator.

11. The station according to claim 10, wherein the processor is further configured to:

transmit a first multi-link request to the access point;

establish a communication connection on the first frequency band with the access point; and transmit a second multi-link request to the access point;

establish a communication connection on the second frequency band with the access point.

12. The station according to claim 11, wherein the processor is further configured to: transmit a multi-link setup request to the access point;

receive a multi-link setup response transmitted by the access point;

transmit a multi-link acknowledgment request to the access point; and receive a multi-link acknowledgment response transmitted by the access point, and establish the communication connection on the second frequency band with the access point.

13. The station according to claim 10, wherein the processor is further configured to:

receive, on the first frequency band, a third data packet transmitted by the access point, the third data packet carrying a third sequence number and the first frequency band identifier, the third sequence number indicating an occurrence order of the third data packet, and the first frequency band identifier indicating the first frequency band;

receive, on the second frequency band, a fourth data packet transmitted by the access point, the fourth data packet and the third data packet being using for transmitting the same service data, a fourth sequence number indicating an occurrence order of the fourth data packet, and the second frequency band identifier indicating the second frequency band; and remove the third data packet or the fourth data packet.

14. The station according to claim 13, wherein the processor is further configured to:

determining the station receives the third data packet ahead of the fourth data packet; and remove the fourth data packet.

15. The station according to claim 14, wherein the processor is further configured to:

determining the station receives the fourth data packet ahead of the third data packet; and remove the third data packet.

16. A non-transitory computer-readable storage medium, comprising instructions, the instructions, when run on a computer of a station, causing the computer to perform:

establishing a multi-link to an access point, the multi-link instructing the access point to provide at least a first frequency band and a second frequency band, and the first frequency band and the second frequency band being two different frequency bands;

transmitting a first data packet to the access point on the first frequency band; and transmitting a second data packet to the access point on the second frequency band, wherein the access point removes the first data packet or the second data packet, wherein a header of the first data packet or the second data packet includes a sequence control field, and the sequence control field carries:

a 12-bit sequence number, a 3-bit band ID, and a 1-bit dual link indicator.

17. The non-transitory computer-readable storage medium according to claim 16, wherein the establishing a multi-link to an access point comprises:

transmitting, by the station, a first multi-link request to the access point;

establishing, by the access point and the station, a communication connection on the first frequency band; and transmitting, by the station, a second multi-link request to the access point;

establishing, by the access point and the station, a communication connection on the second frequency band.

* * * * *